United States Patent
Wang et al.

(10) Patent No.: US 11,402,849 B2
(45) Date of Patent: Aug. 2, 2022

(54) AUTOMATED MATERIAL SPREADING SYSTEM

(71) Applicant: Robo Industries, Inc., Houston, TX (US)

(72) Inventors: Liang Wang, Houston, TX (US); Linli Zhang, Houston, TX (US)

(73) Assignee: Robo Industries, Inc., Houston, TX (US)

( * ) Notice: Subject to any disclaimer, the term of this patent is extended or adjusted under 35 U.S.C. 154(b) by 148 days.

(21) Appl. No.: 16/354,561

(22) Filed: Mar. 15, 2019

(65) Prior Publication Data
US 2020/0293059 A1    Sep. 17, 2020

(51) Int. Cl.
| | |
|---|---|
| G05D 1/02 | (2020.01) |
| E02F 9/26 | (2006.01) |
| G06T 15/00 | (2011.01) |
| G06V 20/56 | (2022.01) |
| E02F 3/76 | (2006.01) |
| G01S 17/42 | (2006.01) |

(52) U.S. Cl.
CPC ........... G05D 1/0251 (2013.01); E02F 9/262 (2013.01); G05D 1/0219 (2013.01); G05D 1/0276 (2013.01); G06T 15/00 (2013.01); G06V 20/56 (2022.01); *E02F 3/7609* (2013.01); *G01S 17/42* (2013.01); *G05D 2201/0202* (2013.01)

(58) Field of Classification Search
None
See application file for complete search history.

(56) References Cited

U.S. PATENT DOCUMENTS

| | | | |
|---|---|---|---|
| 9,014,925 B2* | 4/2015 | Clar | E02F 9/262 |
| | | | 701/50 |
| 9,481,977 B1* | 11/2016 | Clar | E02F 9/2045 |
| 9,487,929 B2* | 11/2016 | Wei | E02F 3/841 |
| 9,702,115 B1* | 7/2017 | Darukhanavala | E02F 9/26 |
| 9,783,955 B1* | 10/2017 | Clar | G05D 1/0219 |
| 2018/0319392 A1* | 11/2018 | Posselius | E02F 9/24 |
| 2020/0029489 A1* | 1/2020 | Bertucci | G05D 1/0212 |
| 2020/0117201 A1* | 4/2020 | Oetken | G06K 9/0063 |

FOREIGN PATENT DOCUMENTS

WO    WO-2017060064 A1 *  4/2017  .......... G01F 23/284

OTHER PUBLICATIONS

John Deere 550K Spreading Topsoil, JimHowDigsDirt, Jun. 16, 2014, https://www.youtube.com/watch?v=qAsQEMpwY3A (Year: 2014).*

* cited by examiner

*Primary Examiner* — Aniss Chad
*Assistant Examiner* — Jennifer M Anda
(74) *Attorney, Agent, or Firm* — Lee & Hayes, P.C.

(57) ABSTRACT

A vehicle may be configured to recognize a material pile and locate the material pile within a physical environment. The vehicle may also determine various characteristics or properties associated with the material pile and, based on the determined characteristics, define one or more tasks associated with spreading the material over a defined region according to defined spreading parameters.

20 Claims, 27 Drawing Sheets

AUTOMATED MATERIAL SPREADING SYSTEM

BACKGROUND

The presence of autonomous vehicles in today's world is becoming more and more common. However, in the field of work vehicles the autonomous control requires more than just determining a position and movement of a vehicle. Therefore, autonomous control of work vehicles is typically reserved for a finishing stage following the leveling of the terrain by an operator controlled vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
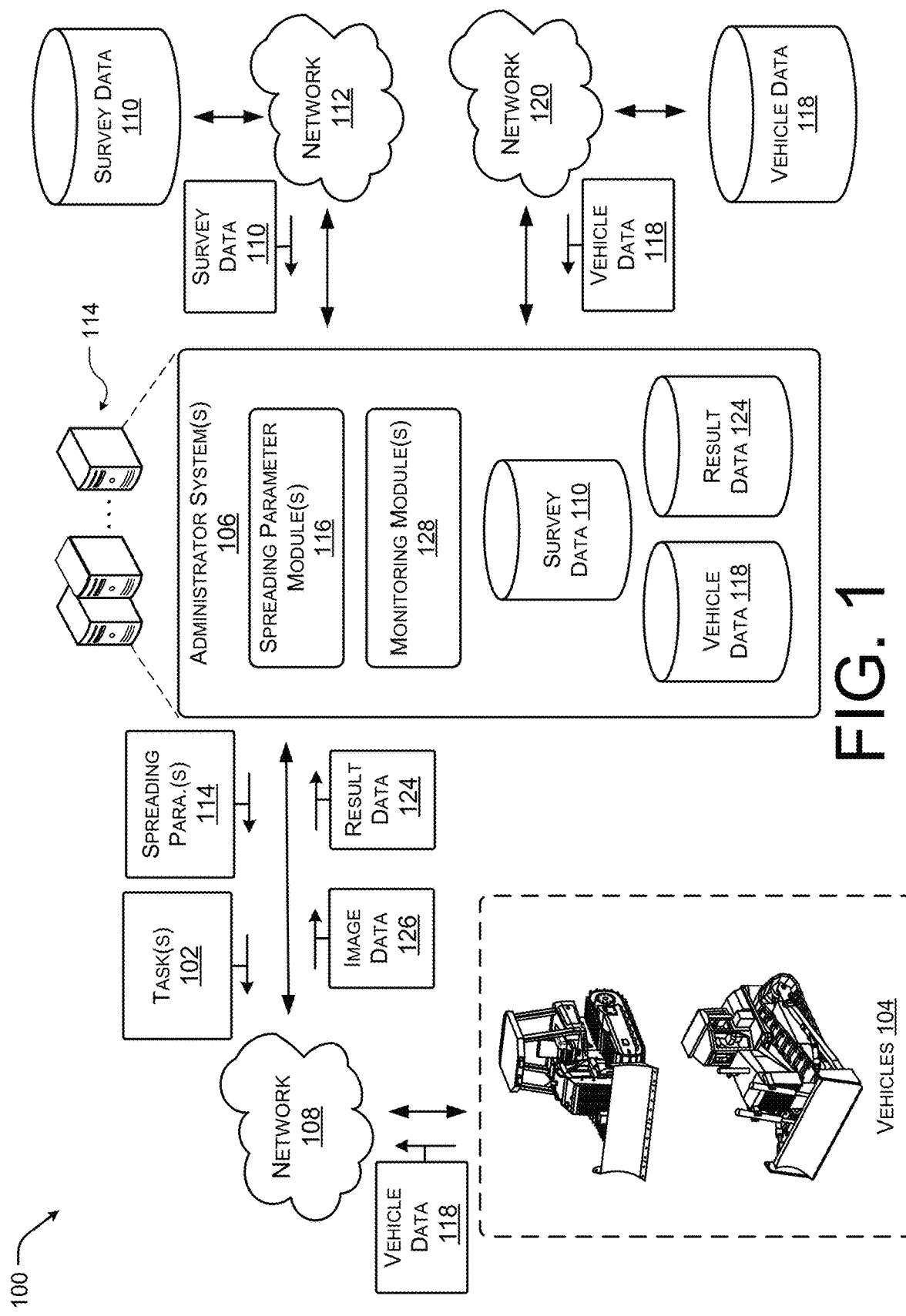
FIG. 1 illustrates an example system for detecting objects of interest and generating tasks to be performed by one or more autonomous vehicles operating on a site according to some implementations.

This disclosure includes techniques and implementations for recognizing and defining tasks associated with an object of interest (OOI) by one more autonomous vehicles on a job site. In some cases, tasks may be defined and performed by the autonomous vehicles to coordinate operations related to one or more OOI on the site in order to achieve an objective (such as leveling, spreading, grading, etc.). In some implementations, initial spreading parameters may be generated using survey data collected by survey stations, survey poles, aerial survey units, or one or more of the work vehicles. The series of tasks may be updated based on information and data collected by the work vehicles as tasks are completed and operations associated with each task are performed and results are logged or recorded in real-time or near real-time.

As described herein, one or more tasks may be generated for each OOI within an area or site. Each task may include one or more paths associated with a vehicle spreading the material of the OOI over the area or site. For example, if a large amount of material is associated with an OOI or a smaller vehicle is being used then multiple paths or passes may be made by the vehicle to spread the material based on the user or machine defined spreading parameters. Each of the paths may include horizontal spreading parameters and vertical spreading parameters. In some cases, the width, height and length of the paths may be selected based on information associated with the vehicles assigned (e.g., power, implement or blade height, implement or blade width, implement or blade capacity (volume), etc.), data associated with the OOI (e.g., material type, amount of material, etc.), and/or information on the site (e.g., size of the area, spreading parameters, desired finished height, etc.). For example, the width, volume, and/or capacity of an implement of a bulldozer assigned to the sub-region may be utilized to define the width of the path.

Each of the paths may be further divided into segments based on the vehicles assigned and the depth of each layer. For example, a bulldozer may be able to operate up to a maximum load on the implement. If the depth of the layer and the length of the path result in a load over the maximum, the path may be divided into multiple segments or multiple layers to allow the bulldozer to operate without exceeding the maximum load. In some cases, the site may also include no-entrance or restricted areas that the vehicles are intended to avoid. For example, the restricted areas may include permanent obstacles, such as rocks, rivers, or standing water, or other environments a vehicle is unable to operate in. In other cases, the restricted areas may be temporary, such as to designate a parking area, temporary offices, rest areas, or housing areas that may move as the tasks of the mission are completed.

In some cases, the vehicles may include various sensors, positioning units, and/or the angle acquisition units. The various sensors, positioning units, and/or the angle acquisition units may be utilized to collect data associated with the site prior to starting an operation or as the vehicles perform the operations (e.g., to collect result data). The data collected may be utilized to update or adjust paths, update task lists, schedule subsequent tasks, request additional vehicles, among others. For example, a bulldozer may determine that a moto-grader is required to provide a finishing level to the area or site after spreading the material. Thus, the number of tasks or paths may be adjusted according to real-time data or feedback collected from the area.

The autonomous vehicles, discussed herein, are configured to navigate to an area, detect one or more OOI(s) within the area, determine a size and material compensation (e.g., dirt, sand, gravel, rock of particular size, etc.), and generate one or more paths associated with spreading the material. In some cases, other vehicles or other obstacles (such as rocks, materials, operators or equipment) may be located on the site within the work range of the vehicle. Thus, the vehicles described herein, may include sensors, image components, or other devices capable of detecting the presence of objects within a predefined distance of the vehicle. For example, the vehicle may be equipped with stereo vision and/or light detection and ranging (LiDAR) vision systems for detecting the OOI as well as unexpected obstacles. In some cases, the detection area of the vision system may be divided or segmented into four regions, left detection zone, right detection zone, front detection zone, and rear detection zone.

In one specific example, as the vehicle discussed herein arrives at a designated site or area, the vehicle may be configured to collect data or scan the area to detect the OOI as well as to determine that the area is clear and safe to begin operations. Once the OOI is detected, the vehicle may analyze the collected data associated with the OOI to determine the amount of material and/or a type of material. For example, the collected data may be image data that includes two-dimensional (2D) or red-green-blue image data and three-dimensional (3D) point cloud data or depth data. In this example, the vehicle may utilize 2D image data to detect the OOI within a represented scene. Once the OOI is detected within the scene (e.g., at a pixel level), the vehicle may determine the real-life physical characteristics, such as volume, shape (e.g., pyramid, mound, cone, etc.), contour profile (e.g., a birds eye view of the OOI, for instance, circle, square, hexagonal), and/or type of material, and/or the real-life physical location of the OOI using the depth data and/or the 3D point cloud data of the scene constructed via the stereo vision system. For instance, the vehicle may translate the pixel position to the physical environment based on the 3D point cloud data of the scene. In the situation where multiple OOIs are located within an area, the vehicle may also determine relative placement or distances between the OOIs using the 3D point cloud data and the pixel distance determined from the 2D data.

Once the physical characteristics of the OOI are determined, the vehicle may define one or more operations associated with the OOI. For example, the operations may be based on vehicle or user defined spreading parameters, machine power configuration, machine implement characteristics (e.g., height, width, volume capacity), and/or the physical characteristics of the OOI. As discussed above, the operation may include one or more paths associated with spreading the material.

As the vehicle spreads the material along the defined paths, the vehicle may collect movement and/or result data (e.g., tilt, yaw, pitch together with position data) to track a result of spreading the material over the surface of the area. The vehicle may periodically (e.g., after each path is complete, after a predetermined number of paths are complete) or substantially continuously update tasks and paths associated with the operations based on the result data. For instance, the vehicle may detect a undercut and overcut regions along the surface and update the remaining tasks associated with the OOI or a nearby OOI to fill in the overcut regions.

Additionally, while the discussion herein, refers to the vehicle processing the image and/or sensor data associated with the site and the OOI(s), it should be understood in various examples, the vehicle, another vehicle in communication with the vehicle, a local computing system in communication with the vehicle, and/or a cloud based service in communication with the vehicle may process the data to identify the OOIs and/or generate the tasks and associated paths.

FIG. 1 illustrates an example system 100 for detecting objects of interest and generating tasks 102 to be performed by one or more autonomous vehicles 104 operating on a site according to some implementations. For example, the vehicles 104 may be equipped with a vision system to monitor a physical environment and a control unit to control the movement of the vehicles 104 and/or implements of the vehicles 104 based at least in part on the image data collected by the vision system.

In the illustrated example, an administrator system 106 is in communication with each of the vehicles 104 via a network 108. In general, the administrator system 106 may collect survey data 110 of a site at which the vehicles 104 are assigned. The survey data 110 may be retrieved from a database via a network 112, stored on a computer-readable media or memory associated with the administrator system 106, or received from the site by a survey device/system. For instance, the survey device may include a survey station, survey pole, other ground-based survey tool, aerial based survey tool, or scanning and position devices and systems installed on the vehicles 104 themselves (e.g., the vision system, angle acquisition units or sensors, and/or position systems). For example, one or more of the vehicles 104 may traverse the site to collect the survey data 110.

The administrator system 106 may be implemented by one or more servers, such as servers 114. Additionally, the servers 114 may host any number of modules to, for instance, allow for a user to define spreading parameters 114 associated with the site and/or one or more OOI. In some cases, the administrator system 106 may also include monitoring modules 128 that allow an operator remote from the vehicle 104 to monitor the operations of the vehicles 104 while tasks are performed.

In some cases, the administrator system 106 may select one or more of the vehicles 104 to perform operations associated with a particular OOI based on vehicle data 118 either stored on the administrator system 106 or accessed via network 120. In other cases, each of the vehicles 104 may send the vehicle data 118 (e.g., vehicle health data) to administrator system 106 in addition to or in lieu of the stored or accessed vehicle data 118. In the current example, the networks 108, 112, and 120 are shown as different networks. However, in some instances, the networks 108, 112, and 120 may be the same network, such as the Internet.

Once initial spreading parameters 114 are sent to the vehicles 104, the vehicles 114 may detect OOIs and generate tasks 102 associated with each OOI based on the spreading parameters 114. As discussed above, the tasks 102 may include one or more paths for spreading the material of the OOI over the site or defined area. As each vehicle 104 completes a path or pass over the site, the vehicle 104 may collect result or terrain data. For instance, each vehicle 104 may be equipped with one or more angle acquisition units that may include one or more accelerometers, one or more gyroscopes, one or more magnetometers, and/or one or more pressure sensors, among other sensors. The sensor data collected by the angle acquisition units may be provided as the results or terrain data 124 to the administrator system 106. In another example, the vehicles 104 may also include position units, such as global navigation satellite systems (GNSS) sensors, which may be in various formats or standards, such as global position system (GPS), GLONASS, Galileo, BeiDou as well as other satellite navigation standards. In some cases, the position data from the position units may be combined with the angle data collected by the angle acquisition units and provided to the administrator system 106 as the result data 124.

In one particular example, the administrator system 106 may receive image data 126 including 2D and/or 3D image data of the physical site or environment from the vehicles 104. In this example, the administrator system 106 may define the tasks 102 and provide the tasks 102 to the vehicles 104, such that the vehicles 104 may perform the tasks 102. In this example, by allowing the administrator system 106 to define the tasks 102 and/or assign tasks 102 to various different vehicles 104 at the site, the administrator system 106 may select vehicles 104 best suited to carry out the tasks 102 associated with each individual OOI. For instance, heavy, stronger, larger and/or more powerful vehicles 104 may be assigned to larger OOI.

Figure 2:
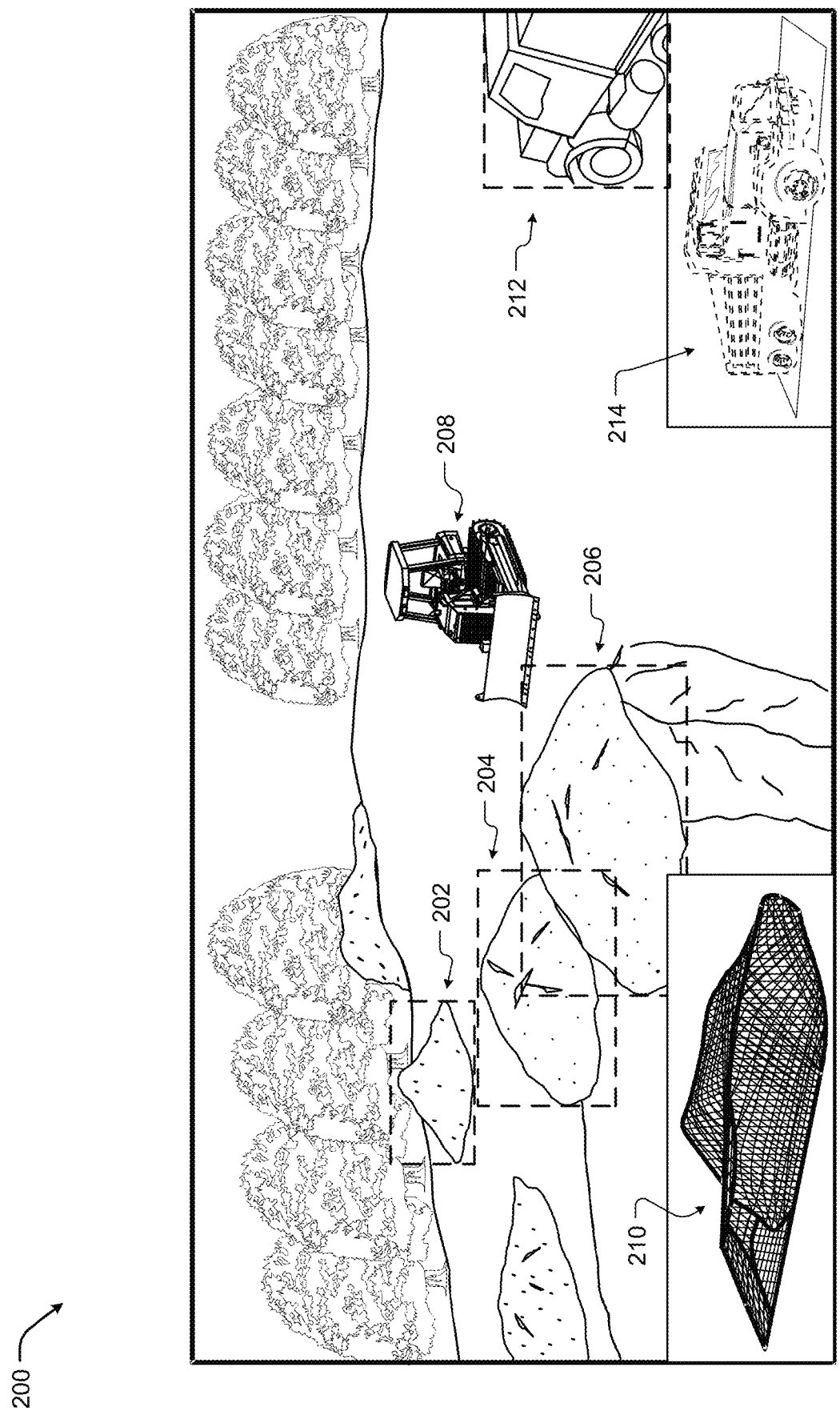
FIG. 2 illustrates an example pictorial diagram showing an example site having three objects of interest to be spread by a vehicle according to some implementations.

FIG. 2 is an example pictorial diagram showing an example site 200 having three objects of interest, such as material piles 202, 204, and 206, to be spread by a vehicle 208 according to some implementations. For instance, in the current example, the vehicle 208 may have detected the OOI 202-206 within image data (e.g., 2D data and 3D point cloud data) of the site 200. In some case, the image data may be captured using a red-green-blue camera, a 3D LiDAR system, and/or a stereo vision system.

The vehicle 208 may then analyze the image data to generate a 3D representation of each material pile 202-206, such as representation 210. For instance, using the 2D and 3D point cloud data, the vehicle 208 may also determine a type of material, amount of material (e.g., volume), height of the material pile, width of the material pile, shape of the material pile, contour profile of the material pile, position coordinate of the material pile, physical distance to the material pile, etc.

The vision system of the vehicle 208 may also detect other objects at the site 200. For instance, in the current example, the vehicle 208 has detected the rock truck 212 and generated a representation 214 of the truck. By detecting the rock truck 212, in addition to the material piles 202-206, the vehicle 208 may anticipate or track the dumping on an additional OOI on the site 200 for spreading or to avoid a collision with the rock truck 212. For instance, the vehicle 208 may maintain a collision zone, and upon detection of the rock truck 212 determine a collision threat based on a likelihood of impact with the truck 212. For instance, the collision threat may be determined based at least in part on a direction of travel of the vehicle 208 and the truck 212.

Figure 3:
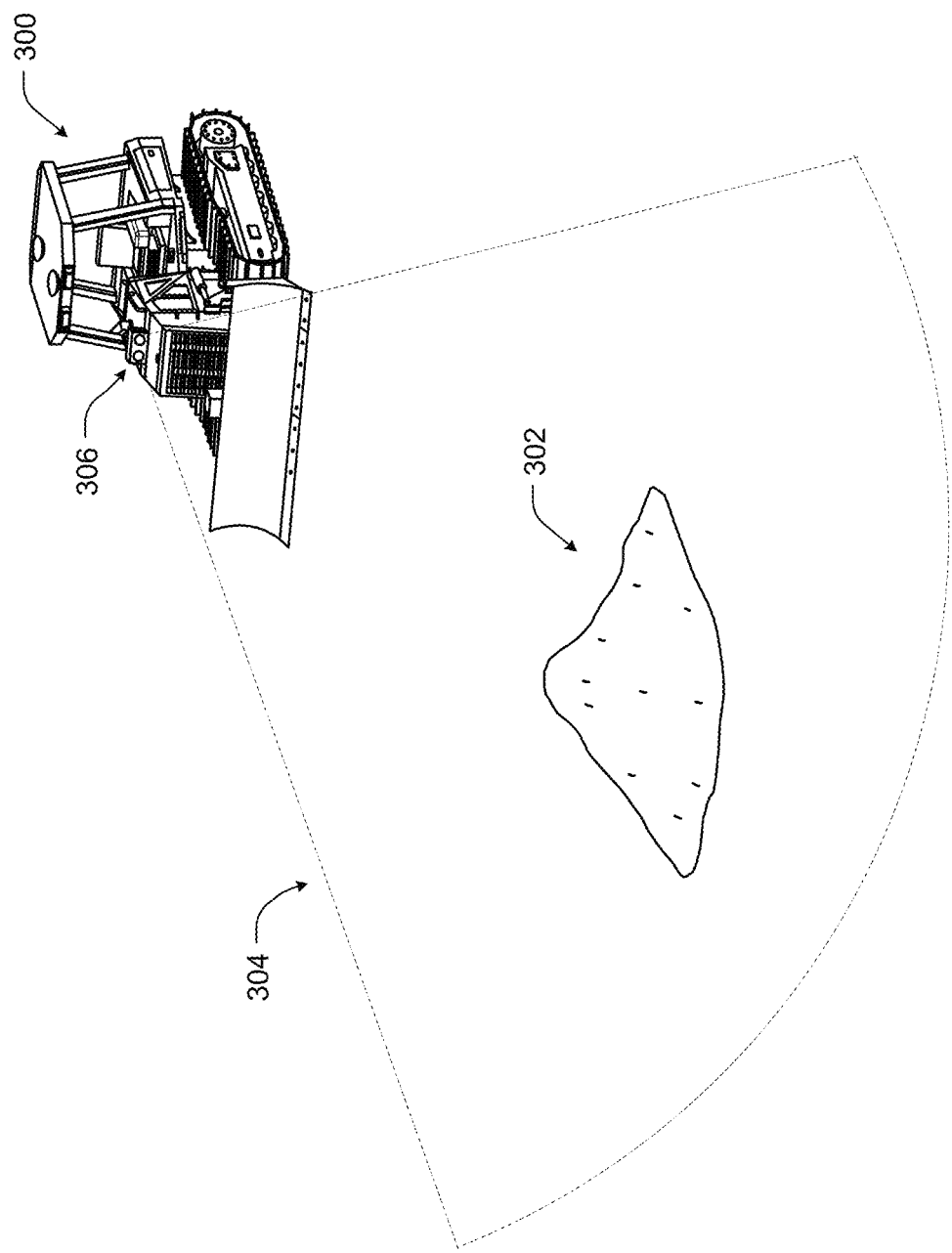
FIG. 3 illustrates an example pictorial diagram showing an example vehicle detecting and analyzing an object of interest according to some implementations.

FIG. 3 illustrates an example pictorial diagram showing an example vehicle 300 detecting and analyzing an object of interest, such as material pile 302, according to some implementations. In the current example, the vehicle 300 may have a field of view 304 associated with the area that the vehicle 300 may capture image data from. In the current example, the field of view 304 is forward of the vehicle 300, however, in other implementations, the field of view 304 may include zones, such as forward, backwards, left, and right of the vehicle 300. In still other implementations, the field of view 304 may be a 360-degree view.

The field of view 304 may be generated by stereo vision or a 3D LiDAR system 306 installed or mounted on the vehicle 304. In the current example, the stereo vision system 306 is shown as an integrated component installed on the hood of the vehicle 300. However, in other implementations, the stereo vision system 306 may be formed from two or more image devices installed on the vehicle 300 with overlapping fields of view 304, as illustrated with respect to FIG. 4. For example, the stereo vision system 306 may allow the vehicle 300 to identify and locate material pile 302 in the physical space by comparing relative positions of the material pile 302 within the captured scene from two vantage points. In one particular instance, the vehicle 300 may identify the OOI 302 within 2D image data and then locate the material pile 302 in the physical space using 3D point cloud data generated by the overlapping image data from each of the image device of the stereo vision system 306. In some cases, the vehicle 300 may also determine from the image data captured by the stereo vision system 306 the volume, shape and contour profile of the material pile 302.

Figure 4:
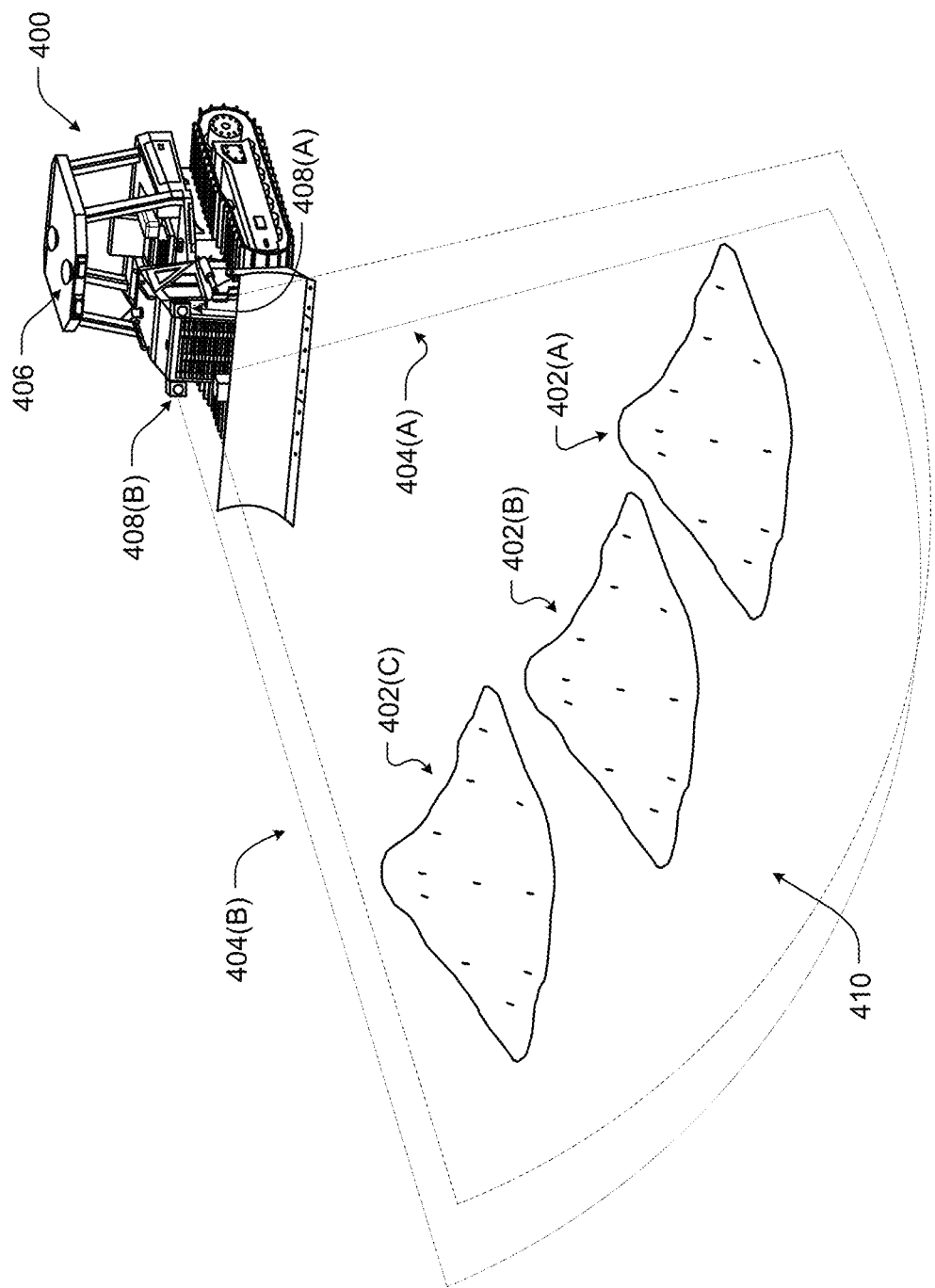
FIG. 4 illustrates an example pictorial diagram showing an example vehicle detecting and analyzing multiple object of interests according to some implementations.

FIG. 4 illustrates an example pictorial diagram showing an example vehicle 400 detecting and analyzing multiple object of interests, such as material piles 402(A)-(C), according to some implementations. Similar to vehicle 300 of FIG. 3, the vehicle 400 is equipped with a stereo vision system that includes two or more image devices 408(A) and 408(B). As discussed above, the stereo vision system may operate by capturing image data from two vantage points or fields of view, generally indicated by 404(A) and 404(B). The image data captured by each of the image devices 408 may be combined to generate 3D point cloud data of a field of view 410 of the vehicle 400. The field of view 410 may be formed by the overlapping field of views 404. In some cases, the vehicle 400 may be equipped with a 3D LiDAR system 406. The 3D LiDAR system may be configured to provide 3D point cloud data and work in conjunction with at least one of the image devices 408.

In general, the vehicle 400 may apply a deep learning inference system may be installed on board the vehicle 400 to process the image data captured by the image devices 408 and to detect, identify, and categorize the material piles 404(A)-(C). For instance, the inference system may utilize the 2D image data from at least one of the image devices 408 to detect the material piles 404(A)-(C). The inference system may then process the 3D point cloud data generated via the stereo image system (e.g., the combined 3D image data from image devices 408(A) and 408(B)) and/or a 3D LiDAR system 406 to determine the physical location, volume, shape, contour profile, and type of material of each of the material piles 404(A)-(C).

Figure 5:
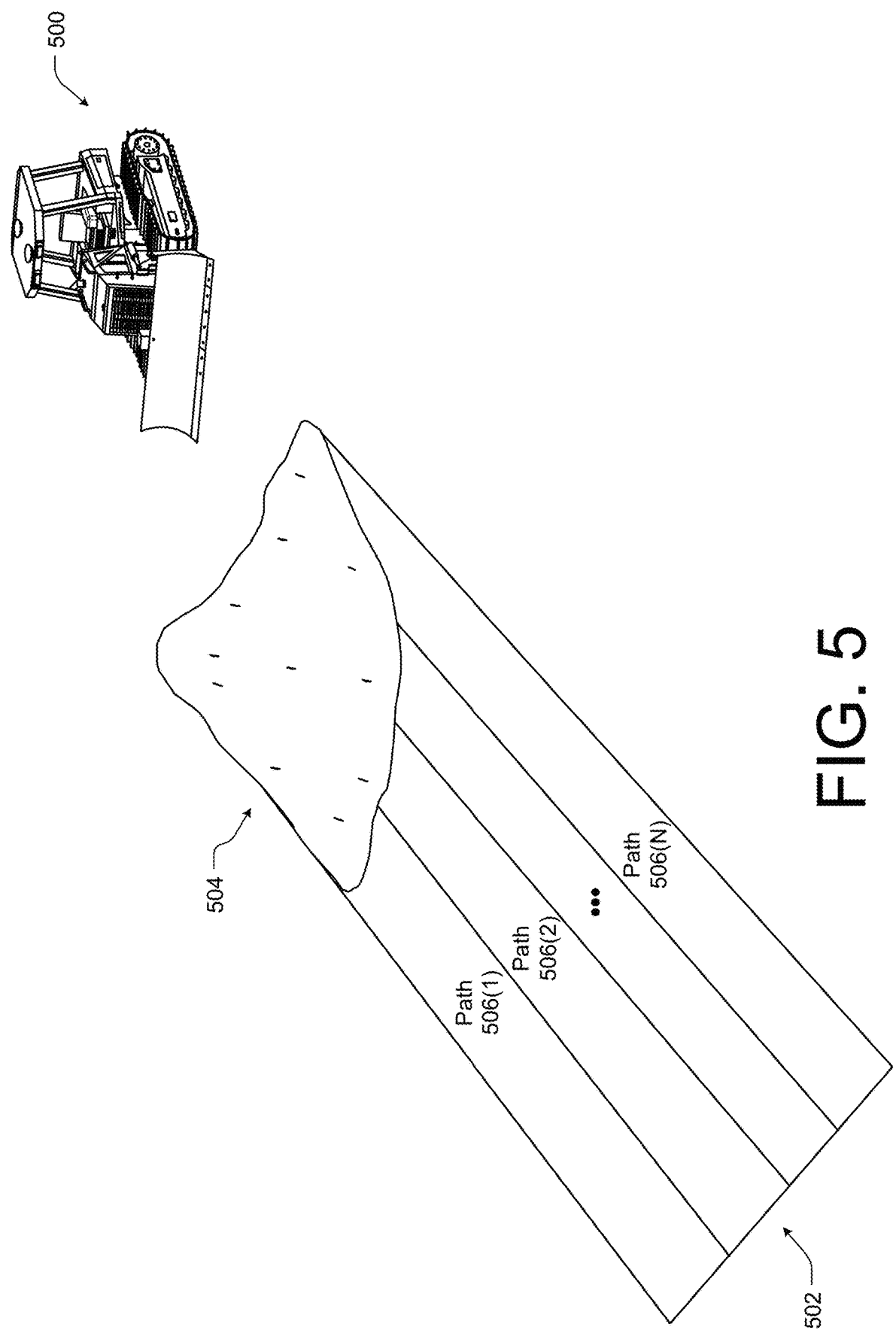
FIG. 5 illustrates an example pictorial diagram showing an example vehicle performing a spreading task associated with a single object of interest according to some implementations.

FIG. 5 illustrates an example pictorial diagram showing an example vehicle 500 performing a spreading task 502 associated with a single object of interest, such as a material pile 504, according to some implementations. In the illustrated example, the task 502 is divided into multiple paths 506(1)-(N). The paths 506 of the task 502 may be generated based at least in part on the physical characteristics (e.g., volume, shape, contour profile, and/or type of material) of the material pile 504 and on defined spreading parameters. For example, the paths 506 may be configured to spread the material of the material pile 504 to evenly cover a defined area at a desired spreading depth (or height). In the current example with a single material pile 504 on the site, the vehicle 500 may order the paths 506 from one side of the material pile 504 to the other, such that material is spread over the path 506(1) first, followed by the path 506(2) and so forth until the path 506(N) is spread.

It should be understood that paths 506(1)-(N) may not have equal length or width, as each path is individually determined by comparing the material volume of that spreading "slot" to the blade capacity to determine how long each spreading path should be and how wide or much of the pile that the blade should process at each pass to maintain an optimal load. More details related to variable length paths are discussed below with respect to FIG. 12.

Figure 6:
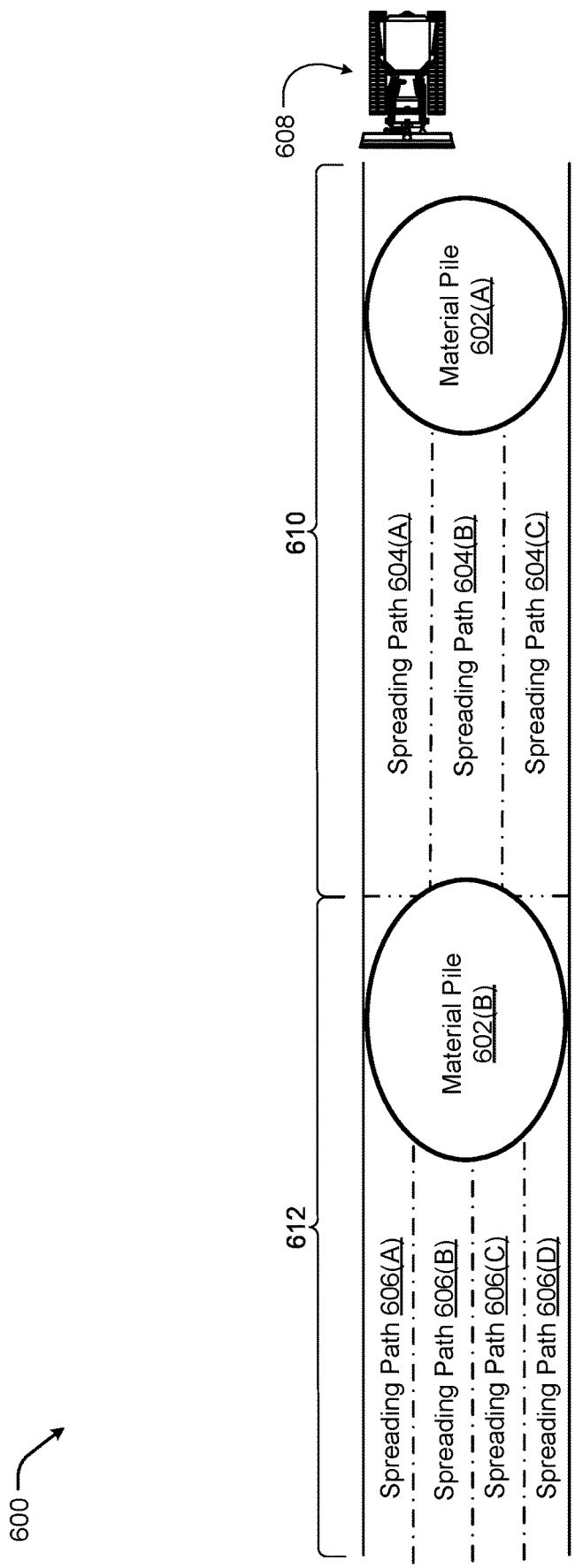
FIG. 6 illustrates an example overhead view of a site with multiple objects of interest and spreading paths defined by a vehicle according to some implementations.

FIG. 6 illustrates an example overhead view of a site 600 with multiple objects of interest, such as material piles 602(A) and 602(B), and spreading paths, 604(A)-(C) and 606(A)-(D), defined by a vehicle 608 according to some implementations. As discussed above, a separate task including multiple paths may be assigned to each of the material piles 602(A) and 602(B). Each task may be divided into multiple paths. For example, the task 610 associated with the material pile 602(A) may include three spreading paths 604(A)-(C) and the task 612 associated with the material pile 602(B) may include four spreading paths 606(A)-(D). The paths 604 and 606 may be generated based at least in part on the physical characteristics (e.g., volume, shape, contour profile, and/or type of material) of the material piles 602(A) and/or 602(B), the characteristics of the vehicle 608, and on defined spreading parameters.

In the current example, the material pile 602(B) may be larger (e.g., larger volume), include a heavier material, the spreading area may be larger (e.g., larger square footage), or wider with respect to the direction of the paths 606 than the material pile 602(A). Thus, the material pile 602(B) may require more paths 606 or passes to spread than the material pile 602(A). For instance, a 2D image device may capture 2D image data and a 3D LiDAR system may generate 3D point cloud data from the physical environment or a stereo vision system may be used to generate both the 2D image data and the 3D point cloud data. An inference system installed on the vehicle 608 may then analyze the 2D image data to detect the material piles 602(A) and 602(B) within the pixel space. The inference system may then process the 3D point cloud data to determine the physical characteristics (e.g., the physical location, volume, shape, contour profile, and type of material) of each of the material piles 6024(A) and 602(B) with respect to the physical site 600 or environment.

Once the physical characteristics of each material pile 602(A) and 602(B) are determined, the inference system may generate the paths 604 and 606 based on the defined spreading parameters (e.g., height/depth of material and the area to cover). In some cases, as the vehicle 608 spreads the material piles 602(A) and 602(B), the vehicle 608 may collect result data associated with the terrain. The result data may then be used to detect overcut and undercut regions with respect to the spreading parameters. In some instances, the vehicle 608 or the inference system may update the paths 604 and 606 to ensure that the undercut regions are lowered to the desired height or level and the overcut regions are raised to the desired height or level. Thus, in some situations, additional paths may be defined during execution of the operations assorted with the tasks 610 and 612.

Figure 7:
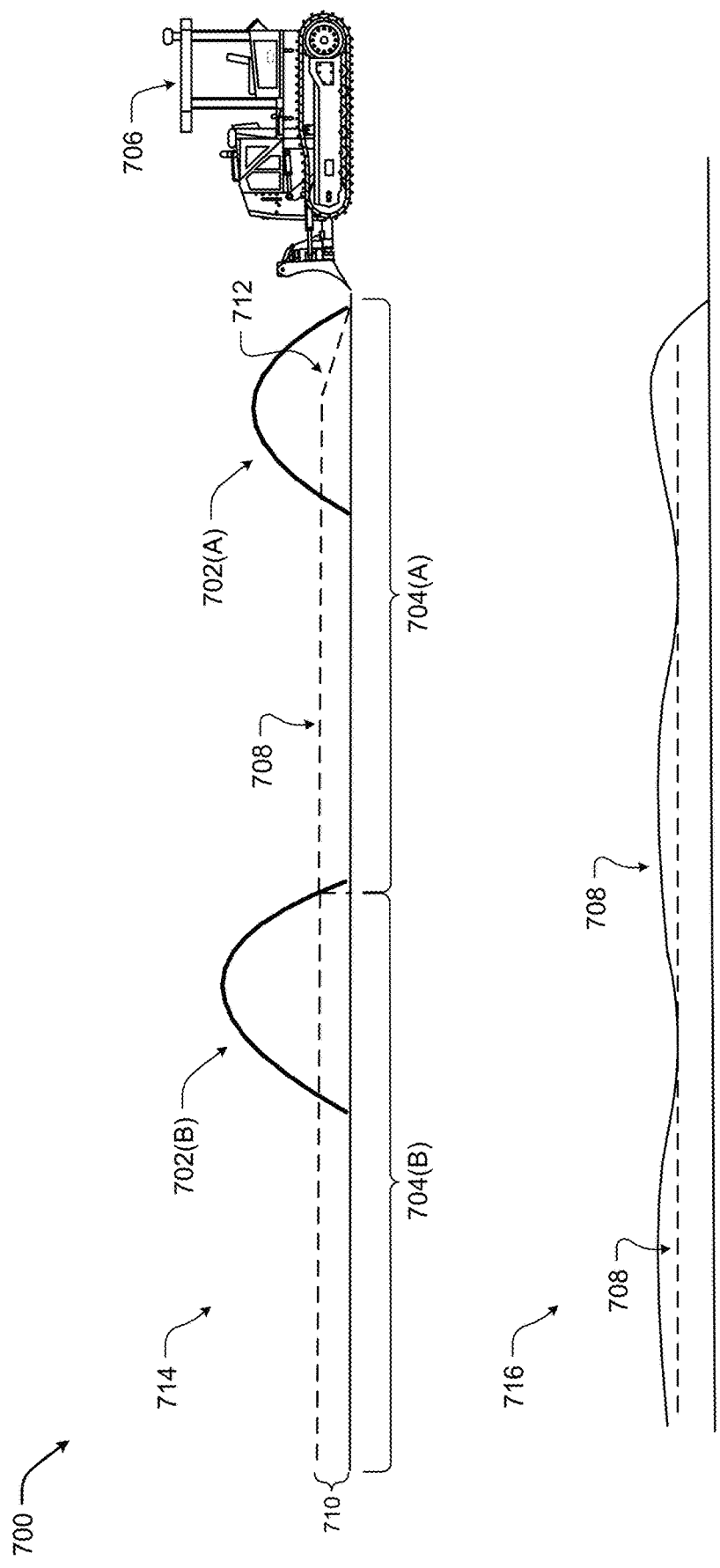
FIG. 7 illustrates an example side view of a site with multiple objects of interest and spreading paths defined by a vehicle according to some implementations.

FIG. 7 illustrates an example side view of a site 700 with multiple objects of interest, such as material piles 702(A) and 702(B), and spreading paths 704(A) and (B) defined by a vehicle 706 according to some implementations. In the current example, a vehicle 706 may be spreading the material of the material piles 702(A) and 702(B) over a predefined area or terrain. The paths 704(A) and (B) may be defined by the vehicle 706 based at least in part on a spreading height profile 708 that includes a spreading depth 710. For example, the spreading height profile 708 may be user defined or system defined to provide an indication of the amount or depth 710 of the material after the piles 702(A) and (B) have been spread by the vehicle 706.

In some cases, the spreading height profile 708 and/or depth 710 may vary based on the terrain associated with the area to be covered. For instance, in some situations, the spreading height profile 708 may be uniform but the depth 710 (e.g., the amount of material at a given location may vary based on the original height of the terrain). In other situation, particular portions of the area may require additional material or an uneven spreading (e.g., such as when a ramp or platform is being constructed). In these situations, the spreading height profile 708 and/or the depth 710 may reflect the ramp or high points.

In the illustrated example, the path 704(A) may include an initial ramp up or gradual slope 712 for the vehicle 706 to reach the desired depth 710. For example, the gradual slope 712 may prevent issues associated with the implement of the vehicle 706 initially engaging the material pile 702(A). In some cases, the spreading height profile 706 may include the slope 712 (e.g., the slope 712 is user or system defined) in other cases the slope 712 may be determined by the vehicle 706 based on data associated with the detected material pile. In the current example, since the material pile 702(A) and the material pile 702(B) are proximate to each other, the vehicle 706 may continue spreading the material of the material pile 702(B) at the depth 710 without requiring a second slope to engage the material pile 702(B). In some instances, the vehicle 706 may adjust the depth 710 to ensure that the second material pile 702(B) may be spread without requiring a second slope, thereby improving efficiency and reducing the overall time associated with spreading the material of the material piles 702(A) and 702(B).

In the illustrated example, environment 714 illustrates the terrain after the material piles 702 are place but prior to the vehicle 706 performing any spreading activities. The environment 716 illustrated the terrain after the material has been spread by the vehicle 706. As shown, in some cases, the material level 718 may differ in small amounts from the desired spreading height profile 708. In these cases, the vehicle 706 may perform additional rounds of spreading to finish the surface within desired tolerances of the spreading height profile 708. In one example, the vehicle 706 may record or log the finish surface data using on board sensors (such as IMUs) or image capture devices. After each finishing pass, the vehicle 706 may compare the log of the finish surface to the spreading height profile 708 to determine if another finishing pass is required. If so the vehicle 706 may determine a new starting location and blade configuration as will be discussed in more detail below.

Figure 8:
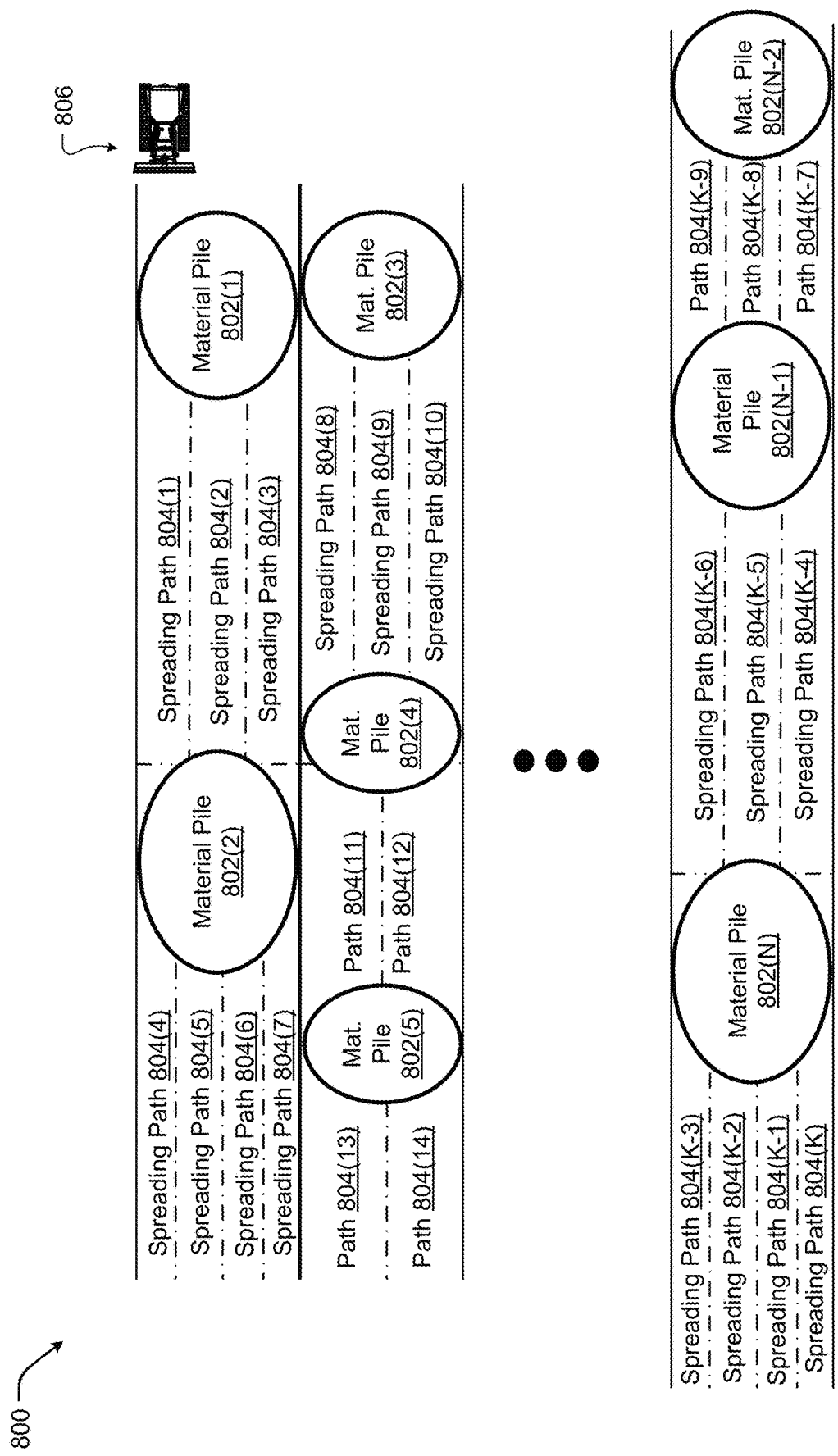
FIG. 8 illustrates an example overhead view of a site with multiple objects of interest and spreading paths defined by a vehicle according to some implementations.

FIG. 8 illustrates an example overhead view of a site 800 with multiple objects of interest, such as material piles 802(1)-(N), and spreading paths 804(1)-(K) defined by a vehicle 806 according to some implementations. In the current example, the vehicle 806 may spread the material of each pile 802(1)-(N) on an individual basis. That is, the vehicle 806 may spread material of pile 802(1), then the material of pile 802(2) until spreading the material of pile 802(N).

Likewise, the vehicle 806 may spread along each of the paths 804(1)-(K) in order from one side to the other. For example, the vehicle 806 may spread the material of pile 802(3) along path 804(8), then the path 804(9), then the path 804(10). It should be understood that the vehicle 806 may spread the material in the opposite direction. For instance, for the material of pile 802(3) along path 804(10), then the path 804(9), then the path 804(8). It should also be understood that the width of each of the paths 804 may vary based on, for instance, the spreading height profile of the proximate area, the size of the implement of the vehicle 806, other characteristics of the vehicle (e.g., power, traction, slip rate, etc.), size or volume of each pile 804, among others.

Figure 9:
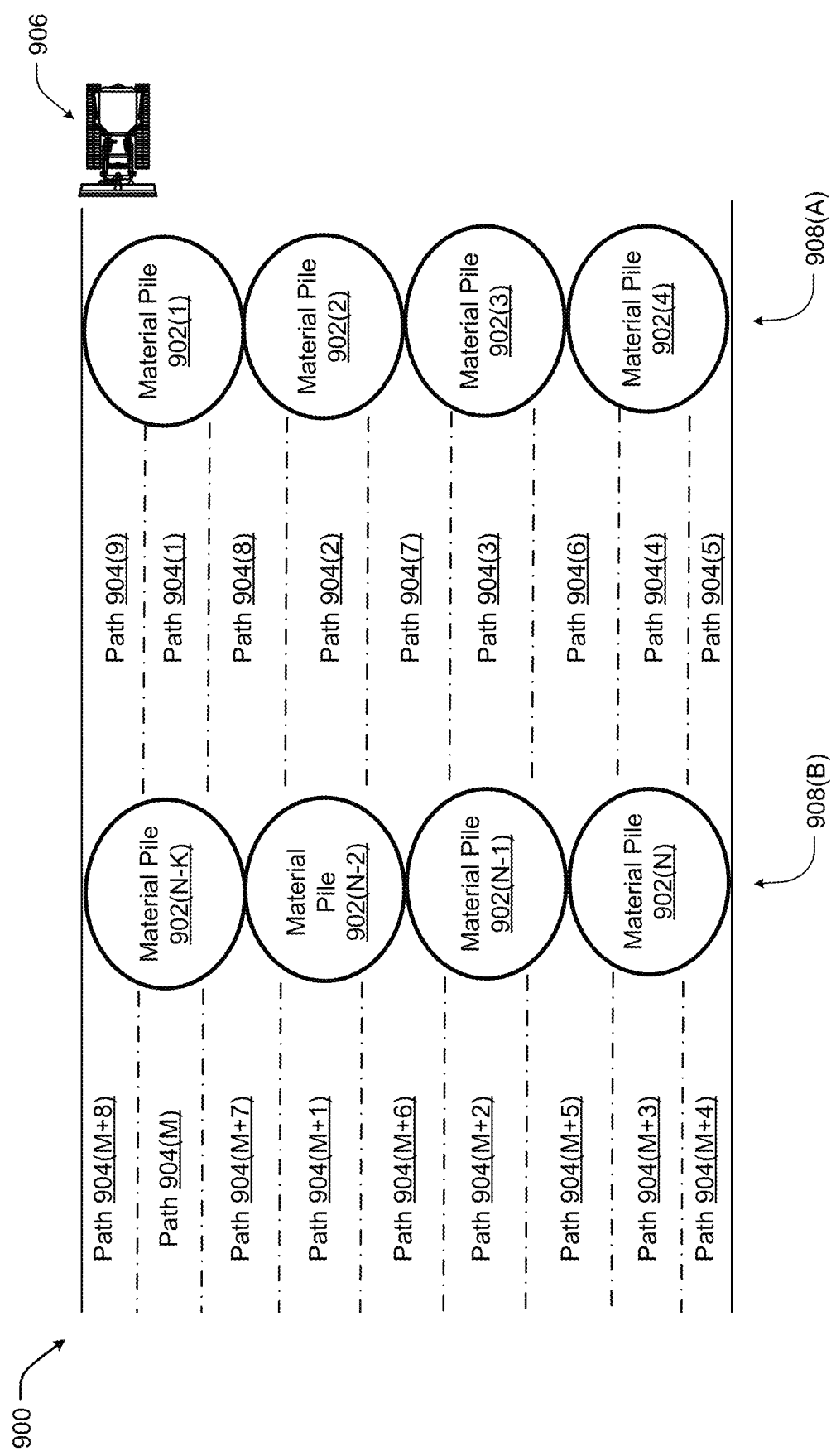
FIG. 9 illustrates an example overhead view of a site with multiple objects of interest and spreading paths defined by a vehicle according to some implementations.

FIG. 9 illustrates an example overhead view of a site 900 with multiple objects of interest, such as material piles 902(1)-(N−K) and spreading paths 904(1)-(M+8) defined by a vehicle 906 according to some implementations. Unlike the example of FIG. 8 above, in the current example, the vehicle 906 may accumulate multiple proximate or adjacent objects, such as piles 902(1)-(4), into a single pile, generally indicated by 908(A), when planning or determining the paths 904(1)-(9) associated therewith. By grouping, treating, or accumulating the piles 902(1)-(4) as a single material pile 908(A), the vehicle 906 may more efficiently allocate characteristics of the paths 904(1)-(9). For example, the vehicle 906 may alter the width of each path 904(1)-(9) based on the spreading height profile, the terrain to be covered, characteristics of each of the piles 904(1)-(9), characteristics of the vehicle 906, etc. For instance, if the vehicle 906 treated the material pile 902(1) and the material pile 902(2) as distinct, the vehicle 906 would plot three paths or passes to spread the material of the pile 902(1) and three paths or passes to spread the material of pile 902(2). However, as illustrated, in the current example, the vehicle 906 has plotted five paths 904(9), 904(1), 904(8), 904(2), and 903(7) to spread the material of the piles 902(1) and 902(2). Thus, the vehicle 906 is able to reduce the number of paths associated with the two piles 902(1) and 902(2) by a full path (e.g., 5 paths instead of 6 are used to spread the material). Further, since the vehicle 906 treats all four piles 902(1)-(4) as one pile 908(A), the vehicle 906 may plot or define 9 paths 904(1)-(9) instead of what would otherwise be 12 paths if each pile 904(1)-(4) were spread independently.

Additionally, in the example of FIG. 8, the vehicle 806 ordered the paths from one side of a pile to the other. However, in the current example, the vehicle 906 has ordered paths 904(1)-(9) to increase the efficiency of spreading the material of the combined pile 908(A). For example, the vehicle 906 may carry out operations associated with each path 904(1)-(9) in the order illustrated. That is, the vehicle 906 may first perform operations associated with path 904(1), followed by path 904(2), followed by path 904(3), until operations associated with the final path 904(9) are performed.

Generally, the order may be from top to bottom, bottom to top, right to left, or left to right depending on the arrangement of the piles 904(1)-(9) and the starting position of the vehicle 906. In the illustrated example, the order is defined from right to left from the perspective of the vehicle 906 (e.g., pile 902(1) first, pile 902(2) second, pile 902(3) third, pile 902(4) fourth). For each pile 902(1)-(4), the vehicle 906 may first define a path associated with the material positioned in the middle of the corresponding pile 902(1)-(4). For example, the first path 904(1) corresponds to the material positioned substantially in the middle of the pile 902(1), the second path 904(2) corresponds to the material positioned substantially in the middle of the pile 902(2), the third path 904(3) corresponds to the material positioned substantially in the middle of the pile 902(3), and the fourth path 904(4) corresponds to the material positioned substantially in the middle of the pile 902(4).

Once the material from the middle of each pile of the combined pile 908(A) is spread, the vehicle 906 performs operations associated with paths that overlap between piles 902(1)-(4). For instance, in the illustrated example, once the operations associated with the paths 904(1)-(4) are complete, the vehicle 906 performs the operations associated with path 904(5), followed by 904(6), followed by 904(7), followed by 904(8), and performs the operations associated with 904(9). In other words, in the current example, the vehicle 906 performs operations associated with the middle of each pile 902(1)-(4) working from right to left with respect to the perspective of the vehicle 906, then performs operation associated with the overlap of each pile 902(1)-(4) from left to right with respect to the perspective of the vehicle 906. In another example, the vehicle 906 may be configured to perform operations associated with a combined pile, such as pile 908(A), by performing operations associated with paths from one a near side to a far side, then back from the far side to the near side to reduce any inefficiency associated with aligning the vehicle 906 for each pass over the material.

Similarly, the vehicle 906 may continue to process combined piles, such as piles 908(B), in the manner discussed above. For instance, in the current example, the vehicle 906 may process the piles 902(N−K)-(N) as a single pile 908(B). In this example, the vehicle 906 may first define a path associated with the material positioned in the middle of the corresponding pile 902(N−K)-(N). For instance, the first path 904(M) corresponds to the material positioned substantially in the middle of the pile 902(N−K), the second path 904(M+1) corresponds to the material positioned substantially in the middle of the pile 902(N−2), the third path 904(M+2) corresponds to the material positioned substantially in the middle of the pile 902(N−1), and the fourth path 904(M+3) corresponds to the material positioned substantially in the middle of the pile 902(N).

Once the material from the middle of each pile of the combined pile 908(B) is spread, the vehicle 906 performs operations associated with paths that overlap between piles 902(N−K)-(N). For instance, in the illustrated example, once the operations associated with the paths 902(N−K)-(N) are complete, the vehicle 906 performs the operations associated with path 904(M+4), followed by 904(M+5), followed by 904(M+6), followed by 904(M+7), and performs the operations associated with 904(M+8).

Figure 10:
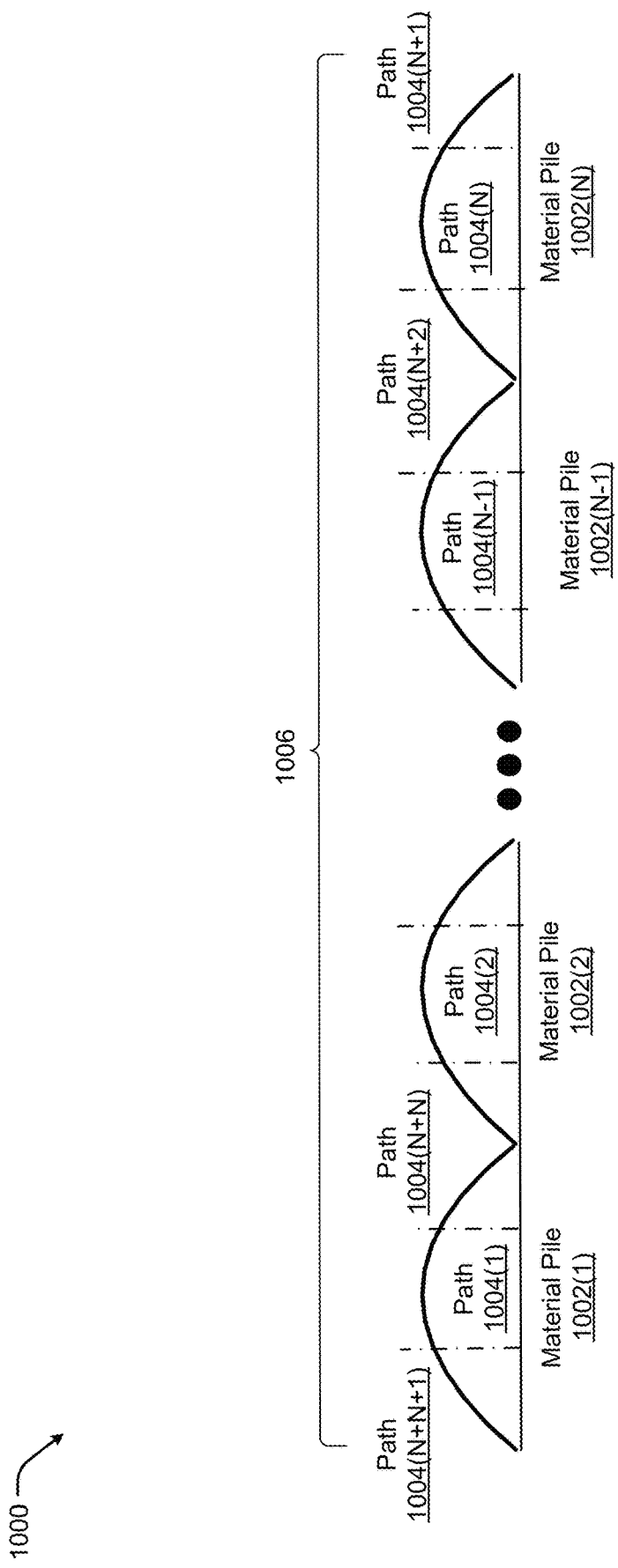
FIG. 10 illustrates an example front view or vehicle view of a site with multiple objects of interest and spreading paths defined by a vehicle according to some implementations.

FIG. 10 illustrates an example front view or vehicle view of a site 1000 with multiple objects of interest, such as material piles 1002(1)-(N), and spreading paths 1004(1)-(N+N) defined by a vehicle (not shown) according to some implementations. In the current example, the vehicle is treating N material piles 1002(1)-(N) as one combined pile 1006. As discussed above, the vehicle may start on one side (in this case the right side) of the combined pile 1006 and perform operations associated with paths corresponding to the material in the middle of each pile 1002(1)-(N). The vehicle may then work in reverse (in this case from the left side to the right side of the combined pile 1006) to spread the remaining material. Thus, the operations of the paths 1004 may be performed in the following order: path 1004(1), path 1004(2), . . . , path 1004(N−1), path 1004(N), path 1004 (N+1), path 1004(N+2), . . . , path 1004(N+N), and path 1004(N+N+1).

Figure 11:
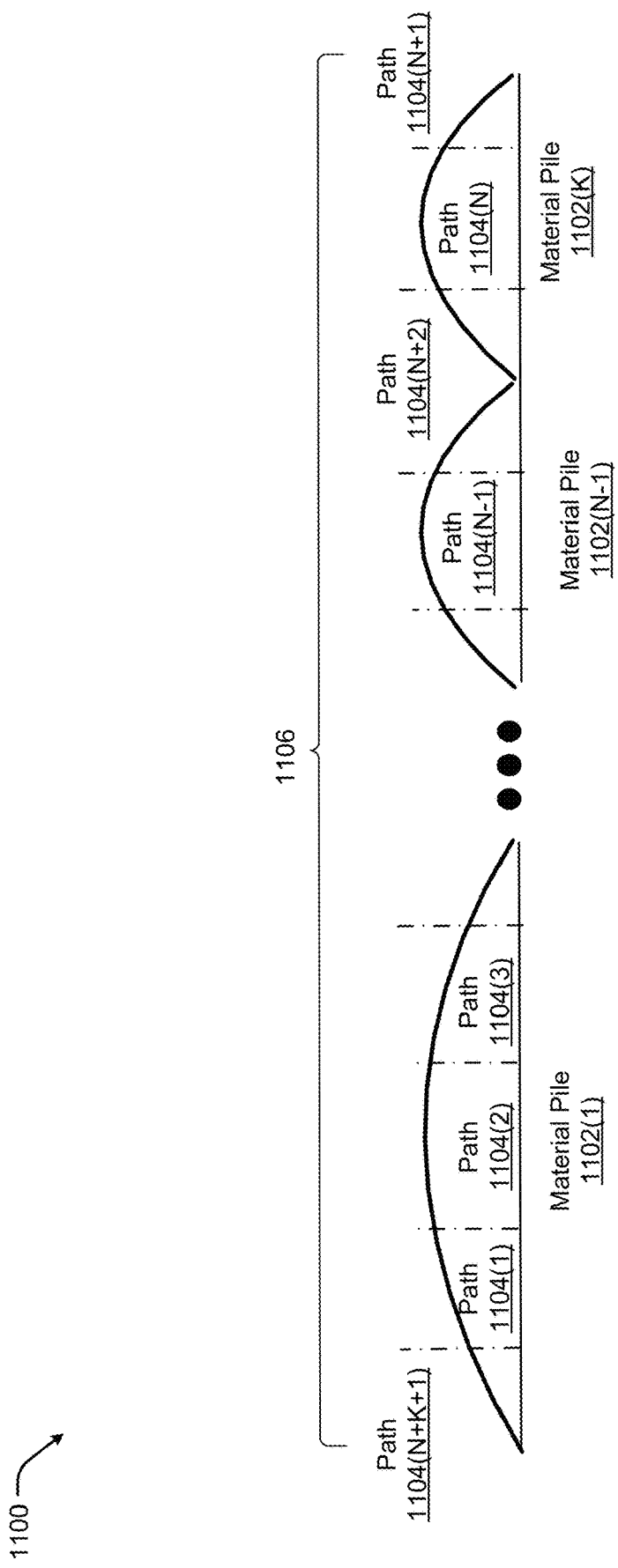
FIG. 11 illustrates an example front view or vehicle view of a site with multiple objects of interest and spreading paths defined by a vehicle according to some implementations.

FIG. 11 illustrates an example front view or vehicle view of a site 1100 with multiple objects of interest, such as material piles 1102(1)-(K), and spreading paths 1104(1)-(N+N) defined by a vehicle (not shown) according to some implementations. In the examples above, each of the piles, such as piles 1102(1)-(K), include material in the middle spread by a single path. However, it should be understood, that in some cases one or more of the piles 1102(1)-(K) may require multiple passes or paths to spread the material within the middle of the pile. For instance, in the current example, the pile 1102(1) may include three paths 1104(1)-(3) to spread the non-overlapping material within the middle of the pile 1102(1). Thus, in this example, the vehicle may again define or generate paths 1104(1)-(N+K+1). In the current example, the vehicle may perform operations of the paths 1104 in the following order: path 1104(1), path 1104(2), 1104(3) . . . , path 1104(N−1), path 1104(N), path 1104(N+1), path 1104(N+2), . . . , path 1104(N+N), and path 1104(N+K+1).

Alternatively, the order of the paths 1104 may be assigned either from left to right or right to left, rather than spreading out the center of each pile first, then sequentially spread backwards, we can just start spreading from one side to the end side in a sequential order. For instance, from left to right or right to left, the order of the paths 1104 are incremental and each path's width and length are determined by either static scan or dynamic scan upon the completion of each path 1104.

Figure 12:
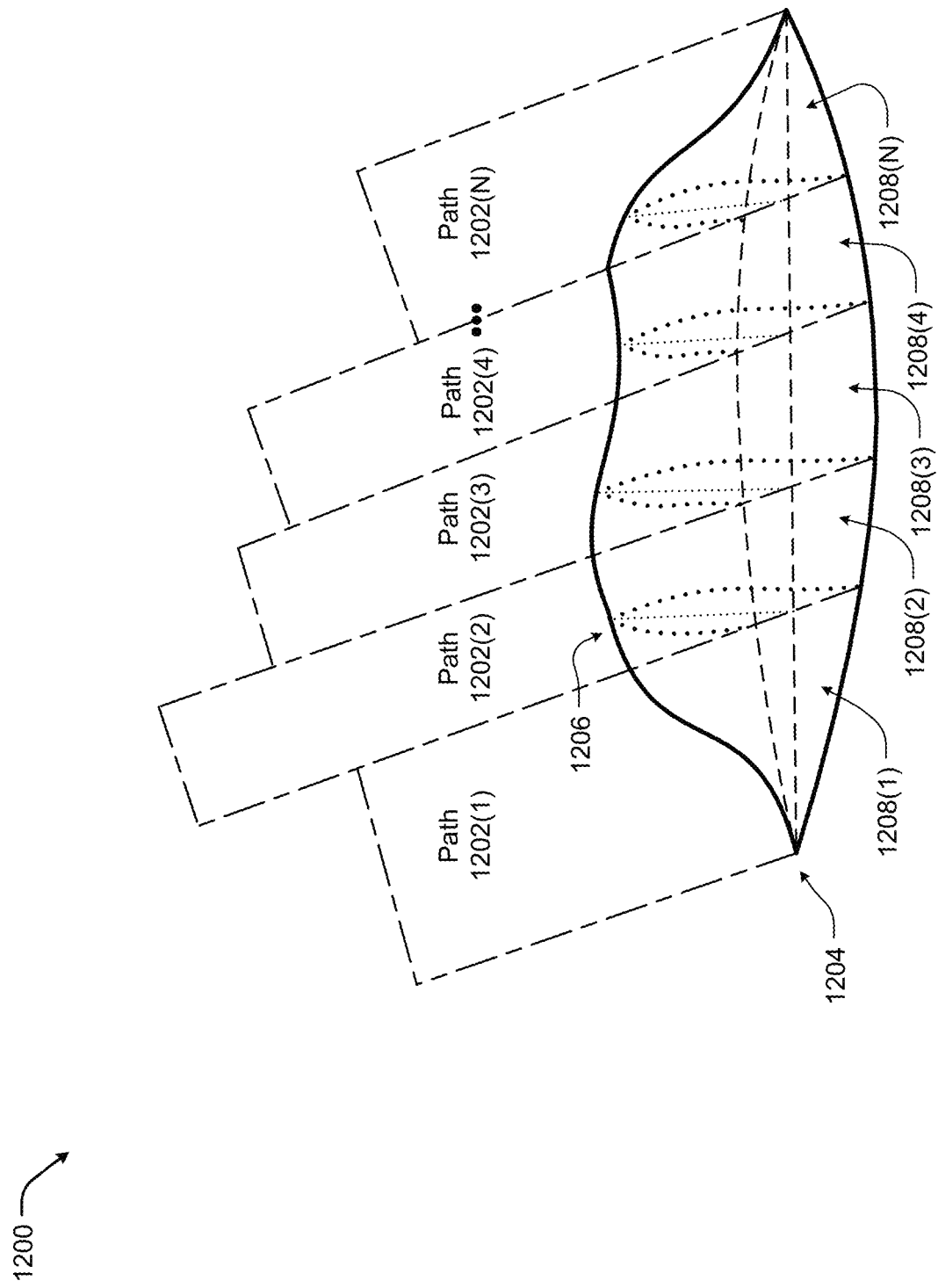
FIG. 12 illustrates another example pictorial diagram showing example spreading paths associated with a single object of interest according to some implementations.

FIG. 12 illustrates another example pictorial diagram 1200 showing example spreading paths associated with a single object of interest according to some implementations. As discussed above, each path 1202(1)-(N) may differ in width and length based on the height of material within the path 1202, the vehicles blade width, capacity, and volume, and the vehicles power. For example, path 1202(1) may be wider and shorter than path 1202(2) as the height/amount of material at point 1204 is small compared with the height/amount of material at point 1206. Thus, the width of the path 1202(1) may be wider than the width of path 1202(2) even if the volume of material 1206(2) spread along the path 1202(2) is equivalent to the volume of material 1206(1) spread along path 1202(1). As the path 1202(1) is wider than the path 1202(2), the path 1202(1) may spread the same volume or amount of material over a short length path, as such the path 1202(1) may be shorter than the path 1202(2). Alternatively, the volume of material 1206(1) may be less than the volume of material 1206(2), and as such the length of the path 1202(2) may be longer than the length of the path 1202(1).

Figure 13:
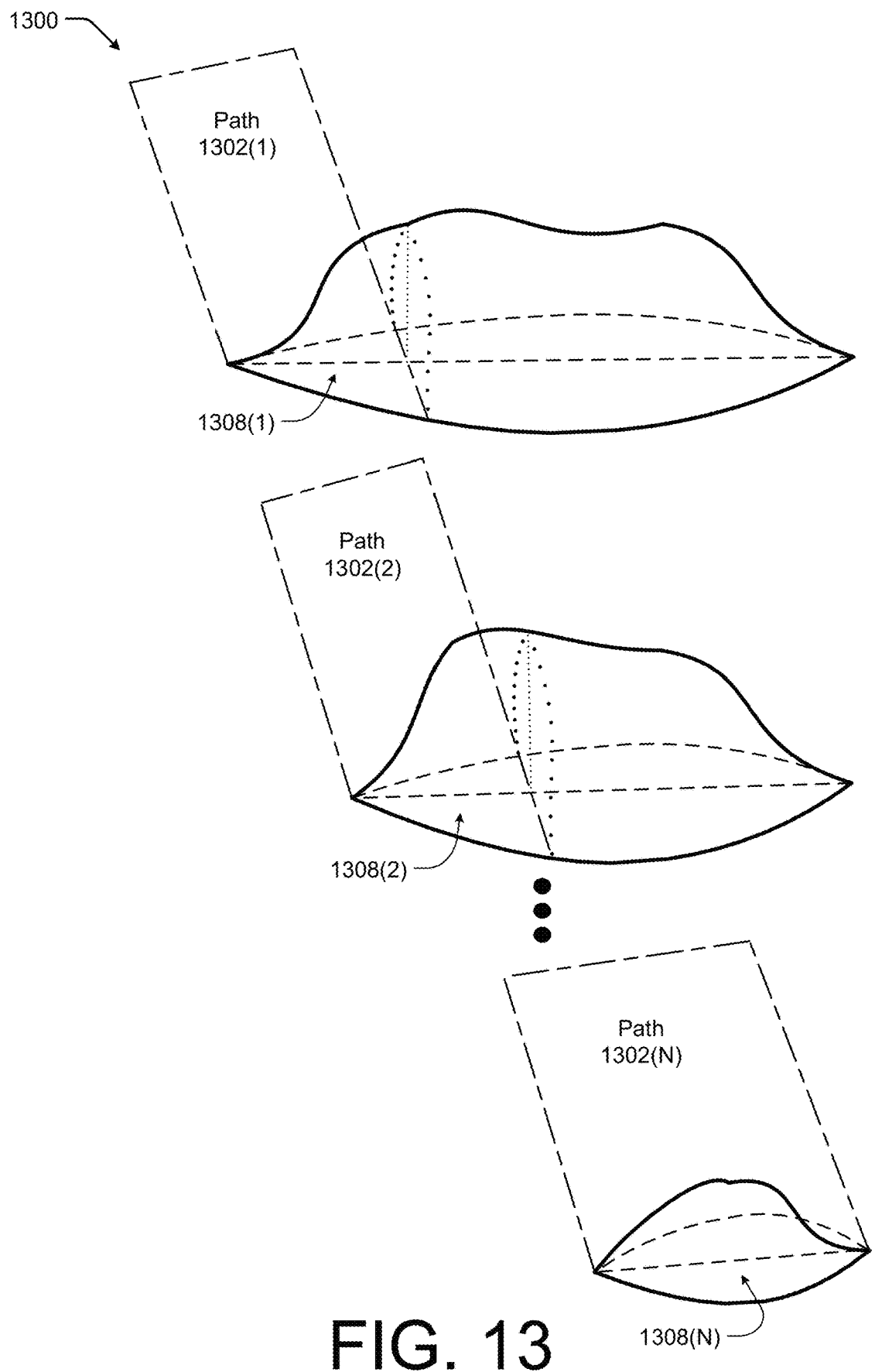
FIG. 13 illustrates another example pictorial diagram showing example spreading paths associated with a single object of interest according to some implementations.

FIG. 13 illustrates another example pictorial diagram 1300 showing example spreading paths 1302(1)-(N) associated with a single object of interest according to some implementations. In some examples, such as the example of FIG. 12 above, the width and length of each path 1202(1)-(N) may be calculated or determined form a global static scan captured prior to initiations of the spreading tasks. Alternatively, as shown in the current example, the width and length of each path 1302(1)-(N) may be determined based on a dynamic scan captured after the completion of each spreading path (e.g., the next path is determined upon the completion of the previous path). For example, a first path 1302(1) may be determined from an initial scan and various known capabilities of the assigned vehicle. Once path 1302(1) is complete, the vehicle or another device may capture another scan before determining the path 1302(2) and so forth.

Figure 14:
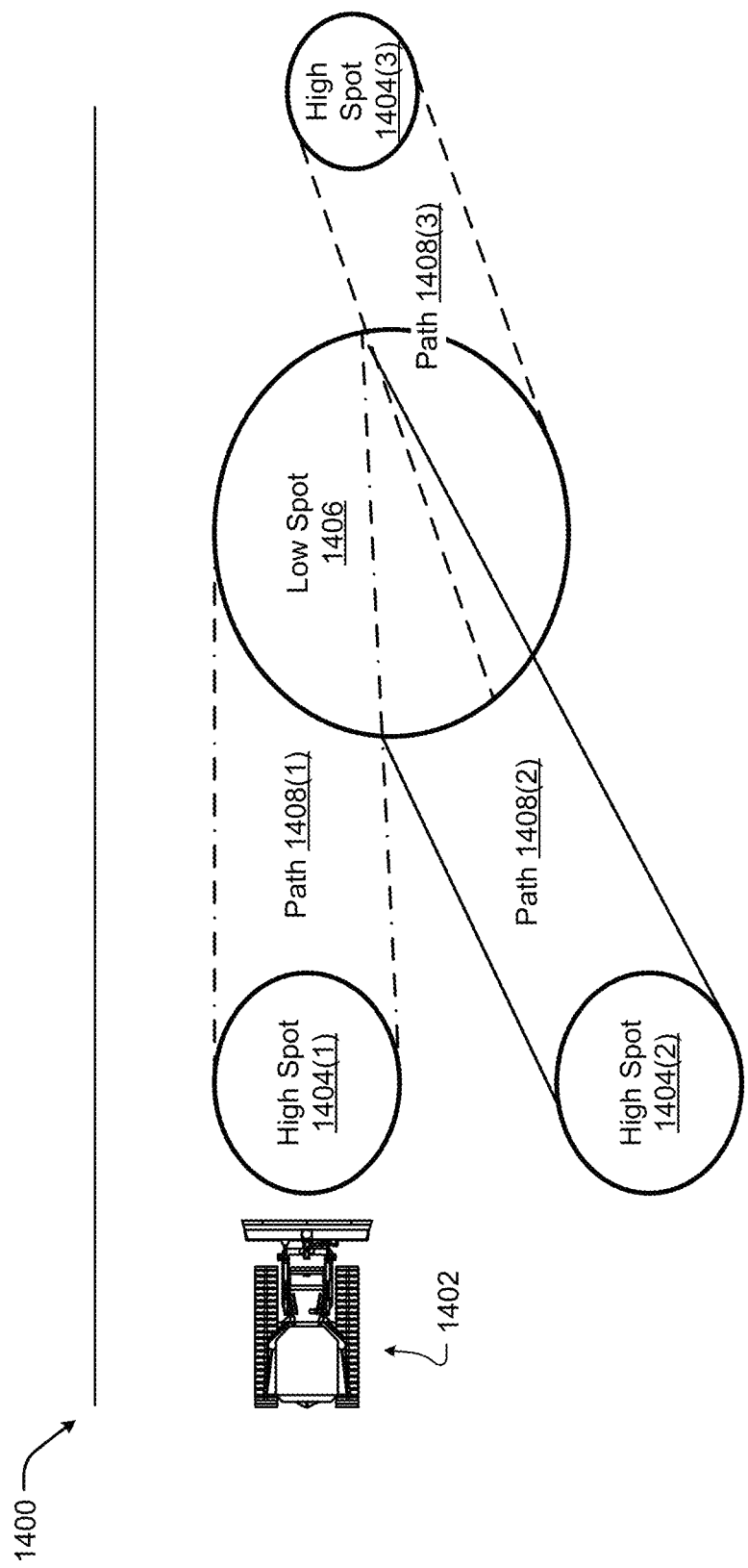
FIG. 14 illustrates an example overhead view of a site after a vehicle has spread the material of one or more material piles according to some implementations.

FIG. 14 illustrates an example overhead view of a site 1400 after a vehicle 1402 has spread the material of one or more material piles according to some implementations. In some cases, the resulting terrain after spreading the material from the piles along the paths may be uneven, as the original terrain may have been uneven. Thus, the site 1400 may include one or more undercut regions, such as undercut regions 1404(1)-(3), in the illustrated example. The site 1400 may include one or more overcut region, such as undercut region 1406, in the illustrated example.

In these cases, the vehicle 1402 may be configured to collect data associated with a surface of the terrain as the vehicle 1402 completes each path. The collected data may be analyzed either by the vehicle 1402 (e.g., an on-board or equipped system), via an on-site system, or via a cloud-based system. In this example, the results of the analysis may identify the undercut regions 1404(1)-(3) and the overcut region 1406. The vehicle 1402 (with or without assistance from the on-site system or via a cloud-based system) may generate additional paths, such as paths 1408 (1)-(3), to move the material of the undercut 1404(1)-(3) over the overcut region 1406 to provide a surface of the terrain substantially matching the spreading height profile (e.g., within a threshold of difference). For example, the surface of the terrain may match the spreading height profile if the surface is less than half an inch from the spreading height profile along the entire area or site 1400. In another example, the surface of the terrain may match the spreading height profile if the surface is less than one millimeter from the spreading height profile along the enter area or site 1400. In various other examples, the surface of the terrain may match the spreading height profile if the surface is between, for instance, 2 and 4 centimeters from the spreading height profile along the enter area or site 1400.

In the current example, each of the undercut regions 1404 are shown with a single corresponding path 1408, however, it should be understood that the vehicle 1402 may generate multiple paths to move the material of the undercut regions 1404(1)-(3) over the overcut region 1406. In some cases, if the undercut regions 1404(1)-(3) may be combined into a single pile for spreading and generate multiple paths, as discussed above.

Figure 15:
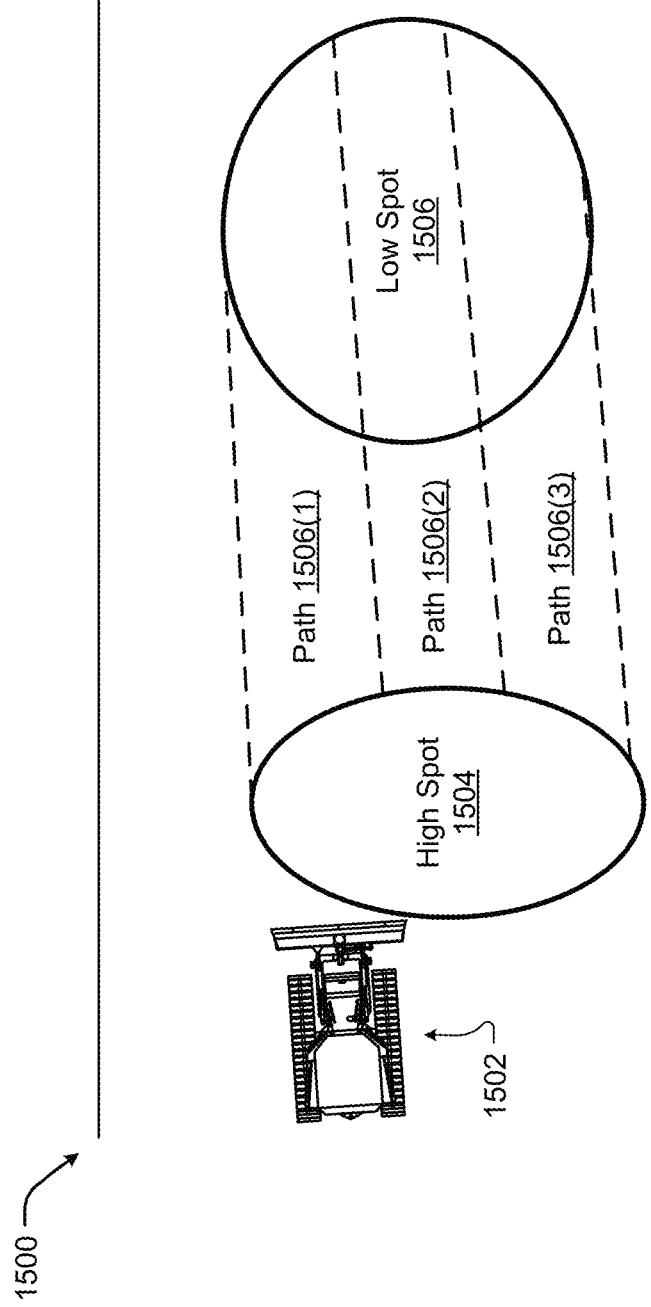
FIG. 15 illustrates an example overhead view of a site after a vehicle has spread the material of one or more material piles according to some implementations.

FIG. 15 illustrates an example overhead view of a site 1500 after a vehicle 1502 has spread the material of one or more material piles according to some implementations. In the current example, the vehicle 1502 has detected at least one undercut regions 1504 and at least one overcut 1506 within the area of the site 1500. Similar, to when a single pile is detected, the vehicle 1502 may generate paths 1506(1)-(3) to spread the excess material at the undercut regions 1504 over the overcut region 1506. As discussed above, the vehicle 1302 may perform the operation of the paths 1506(1)-(3) in order from one side of the undercut regions 1504 to the other, for instance, the operations of the path 1506(1), then the operations of the path 1506(2), and finally the operations of the path 1506(3), as shown.

FIGS. 16-25 are flow diagrams illustrating example processes associated with spreading of material by an autonomous vehicle with an implement according to a spreading height profile. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures, or environments.

Figure 16:
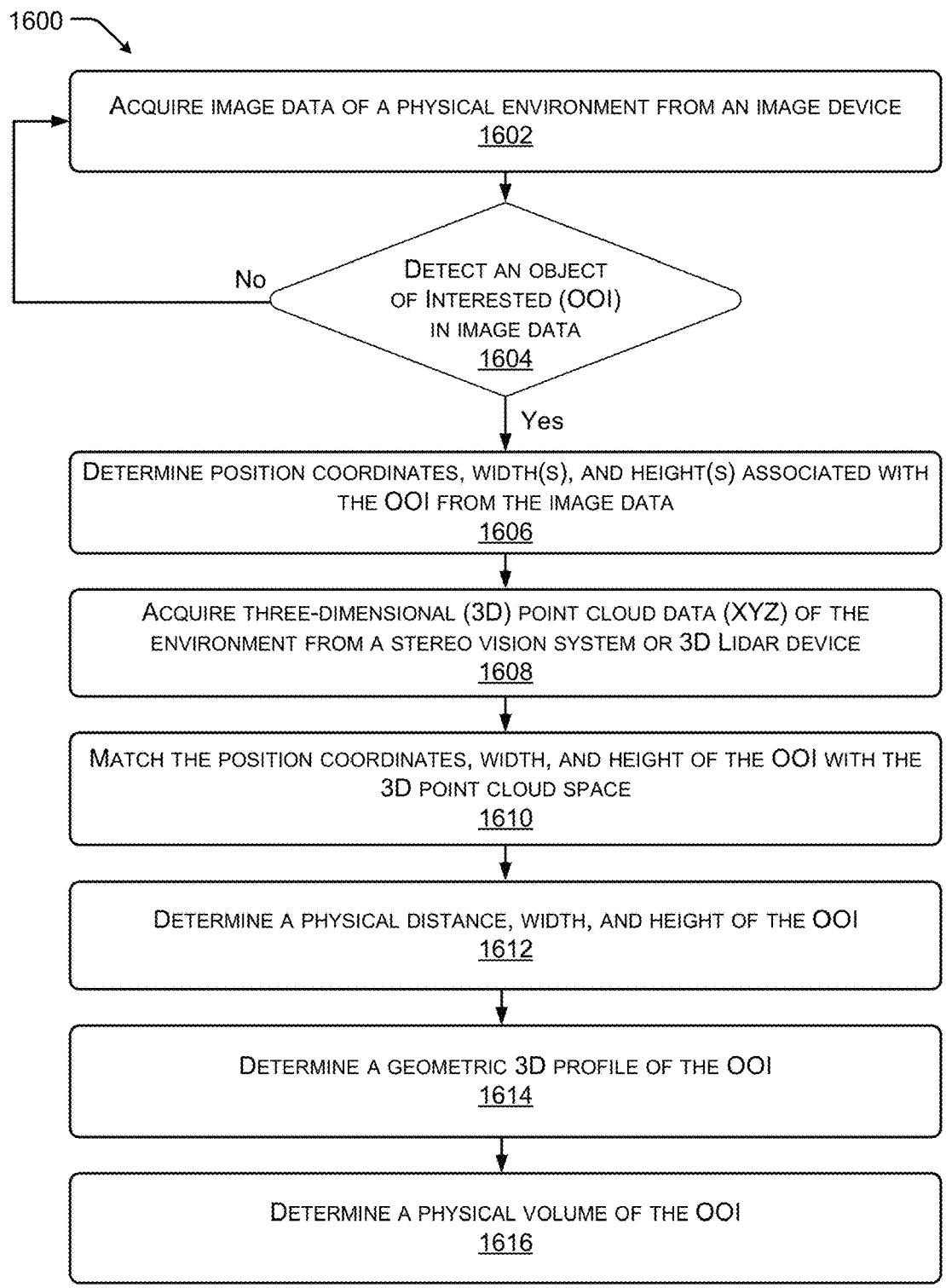
FIG. 16 is an example flow diagram showing an illustrative process for detecting an object of interest associated with a site according to some implementations.

FIG. 16 is an example flow diagram showing an illustrative process 1600 for detecting an OOI associated with a site according to some implementations. As discussed above, tasks may be defined and performed by the autonomous vehicles assigned to a site. In some cases, the vehicle may be configured to coordinate operations related to one or more OOI on the site in order to achieve an objective (such as leveling, spreading, grading, etc.). Prior to generating the tasks or paths associated with each OOI, the vehicle detects, locates, and defines characteristics associated with each OOI as discussed below.

At 1602, a vehicle may acquire image data of a physical environment from an image device. For example, the vehicle may be equipped with stereo vision and/or LiDAR vision systems that may be configured to capture red-green-blue or 2D image data as well as depth data and/or 3D image data. In some cases, the stereo vision system may include at least two image devices spaced apart but configured to capture image data of an overlapping area of the physical environment.

At 1604, the vehicle may determine if an OOI is detected within the current image data. For example, the vehicle may process the 2D image data to determine if an OOI, such as a material pile, is present in the represented scene. In some cases, the type of OOI may be predefined, such as the material pile discussed above. If there is no OOI, the process 1600 returns to 1602 and additional image data is acquired. However, if an OOI of the correct type (e.g., a material pile) is detected, the process proceeds to 1606.

At 1606, the vehicle may determine position coordinates, width, and height associated with the OOI from the image data. For example, the vehicle may determine the pixel space associated with the OOI and the location within the scene using the 2D image data.

At 1608, the vehicle may acquire 3D point cloud data (XYZ) of the environment from a stereo vision system or 3D LiDAR device. For instance, as discussed above, the vehicle may be equipped with a stereo vision system including at least two image devices spaced apart but configured to capture image data of an overlapping area of the physical environment and/or with a 3D LiDAR device or other types of depth cameras.

At 1610, the vehicle may match the position coordinates, width, and height of the OOI with the 3D point cloud space. In one example, the vehicle may determine the pixel space associated with the OOI and the location within the scene using the 2D image data and then map the 2D pixel space coordinates to the 3D point cloud data for each OOI.

At 1612, the vehicle may determine a physical distance, width and height of the OOI. In one example, the vehicle may determine the pixel space associated with the OOI and the location within the scene using the 2D image data and then place the object (e.g., location and scale) using the 3D point cloud data. For instance, based on the 3D data the vehicle may determine a scale factor associated with the 2D data based on the depth or distance to the OOI and/or other object and then apply the scale factor to the 2D data representing the OOI to determine the physical position coordinates (e.g., the physical distance), width, and height data. For instance, in one example, the object center pixel in the 2D space, represented as position x and y, may be divided with the image width and height to get the relative/scaled position inside the scene. In the 3D physical world space, the vehicle may search the area with the relative position inside the scene obtained from the 2D image space. If there is an object (say with enough data points above the ground), then the vehicle may process the point cloud data to get the object width, height and the averaged distance to the stereo camera center. In other words, the 2D image detection is used to tell whether/if there is an OOI presents or not. If presents, a possible location and/or direction of the OOI relative to the vehicle. The 3D point cloud data is then used to determine details associated with the OOI.

At 1614, the vehicle may determine a geometric 3D profile of the OOI based at least in part on the physical coordinates, width, and height data as well as the 2D and 3D image data.

At 1616, the vehicle may determine a physical volume of the OOI. For example, the vehicle may utilize the geometric 3D profile, the 2D image data, and/or the 3D image data to assist with determining a volume of the OOI. Once, the volume of the OOI is known, the vehicle may determine one or more paths associated with spreading the material of the object as discussed above with respect to FIGS. 1-15.

Figure 17:
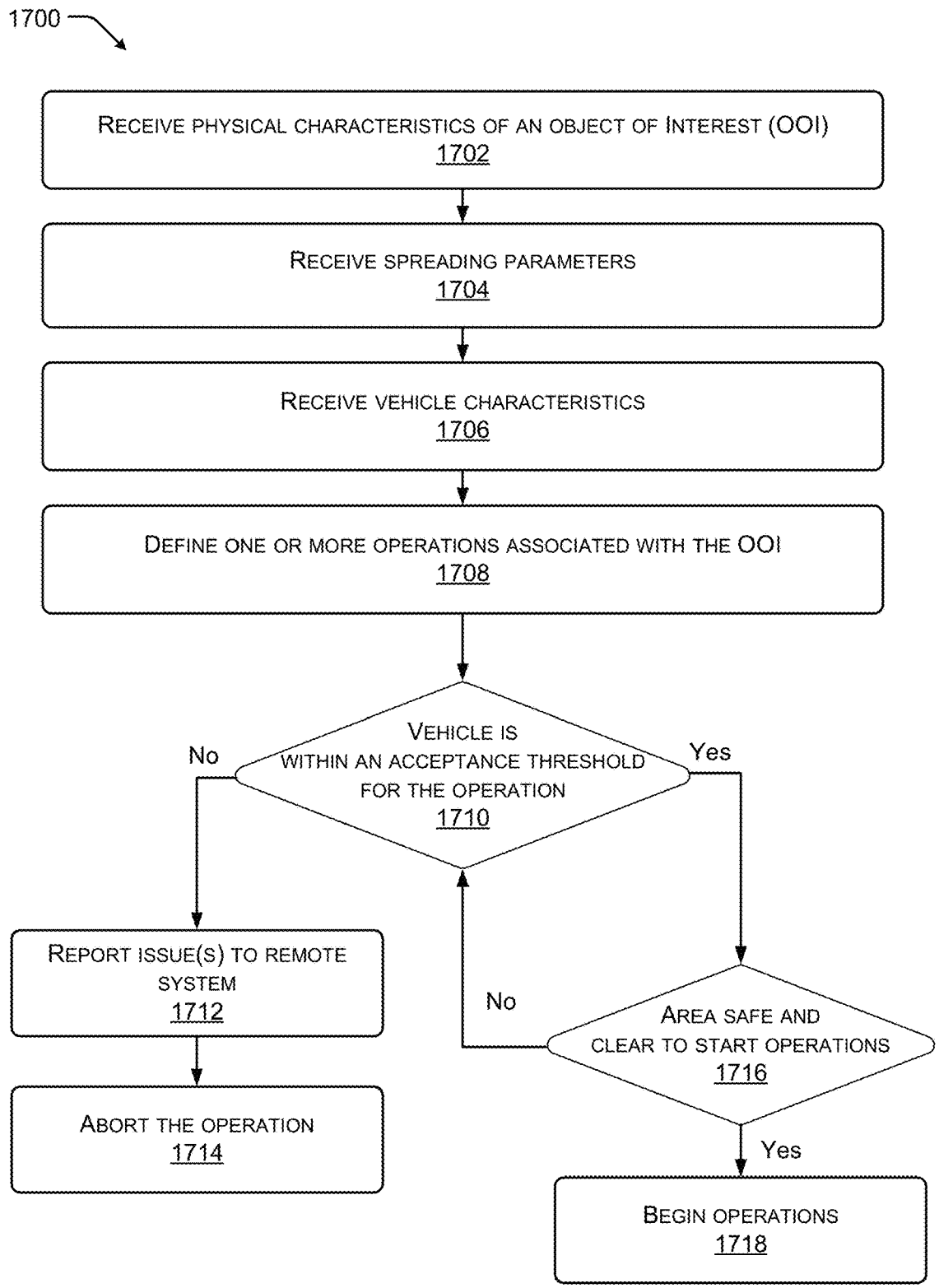
FIG. 17 is an example flow diagram showing an illustrative process for initial mission planning with respect to one or more objects of interest according to some implementations.

FIG. 17 is an example flow diagram showing an illustrative process 1700 for initial mission planning with respect to one or more object of interest according to some implementations. As discussed above an autonomous vehicle may be assigned to a site or area to preform operation associated with spreading material based on one or more spreading height profile or spreading parameters. Once an object is detected and the physical position or coordinates, width, height, volume, and/or contour profile are determined, as discussed above with respect to FIG. 16, the vehicle may proceed to determine if operations with the OOI should commence.

At 1702, a vehicle may receive physical characteristics of an OOI. For example, the vehicle may calculate or determine the physical characteristics as discussed above with respect to FIG. 16. In other cases, the vehicle may receive the physical characteristics from a cloud-based service or a remote device. In some cases, the physical characteristics may include physical position or coordinates, width, height, volume, and/or contour profile.

At 1704, the vehicle may receive spreading parameters. For instance, the spreading parameters may include a spreading depth, spreading height profiles as discussed above with respect to FIG. 7, as well as spreading boundaries, spreading accuracy tolerance, spreading direction, spreading side, transitional ramps if needed, among others.

At 1706, the vehicle may receive vehicle characteristics. In some cases, the vehicle characteristics may be stored internally while in other case the vehicle characteristics may be received from a cloud-based service or remote device. In some example, the vehicle characteristics may include machine power configuration, blade width, blade height, and/or blade volume capacity. Other examples of vehicle characteristics may include vehicle size, steering radius, engine capacity, fuel tank size, equipment, implement blade size, maximum speed, minimum speed, acceleration, towing capacity, horse power, tread size or width, maintenance issues or history, etc.

At 1708, the vehicle may define or determine one or more operations associated with the OOI. For example, the OOI may be a material pile, as discussed above, and the operations may include one more paths or tasks associated with spreading the material according to the spreading parameters.

At 1710, the vehicle may determine if the vehicle is within an acceptance threshold for the operation. For example, the vehicle may perform test procedures and track one or more performance metric associated with the execution of the test procedures to determine if the vehicle is within the acceptance threshold. If the vehicle is not within the acceptance threshold, the vehicle is unfit to perform the operations and the process 1500 proceeds to 1512. However, if the vehicle is within the acceptance threshold, the process 1500 advances to 1516.

At 1712, the vehicle may report issues to a remote system. For example, the vehicle may notify a site operator via a mobile computing device assigned to the site operator. In other cases, the vehicle may send the report to a cloud-based system or to an on-site remote system.

At 1714, the vehicle may then abort the operation. For example, if the vehicle is unable to raise and/or lower an implement, the vehicle may be unfit to spread the material and, thus, may abort the operations before causing damage or delay with respect to a project.

At 1716, the vehicle may determine if the area is safe and clear to start operations. For example, the vehicle may analyze image data captured substantially contemporaneously to determine that no obstacles or individuals are within the area associated with the operations. If the area is not safe and clear, the vehicle may hold and the process 1700 may return to 1716 until the area is safe and clear. If the area is however, safe and clear the process 1700 proceeds to 1718, and the vehicle begins operations.

Figure 18:
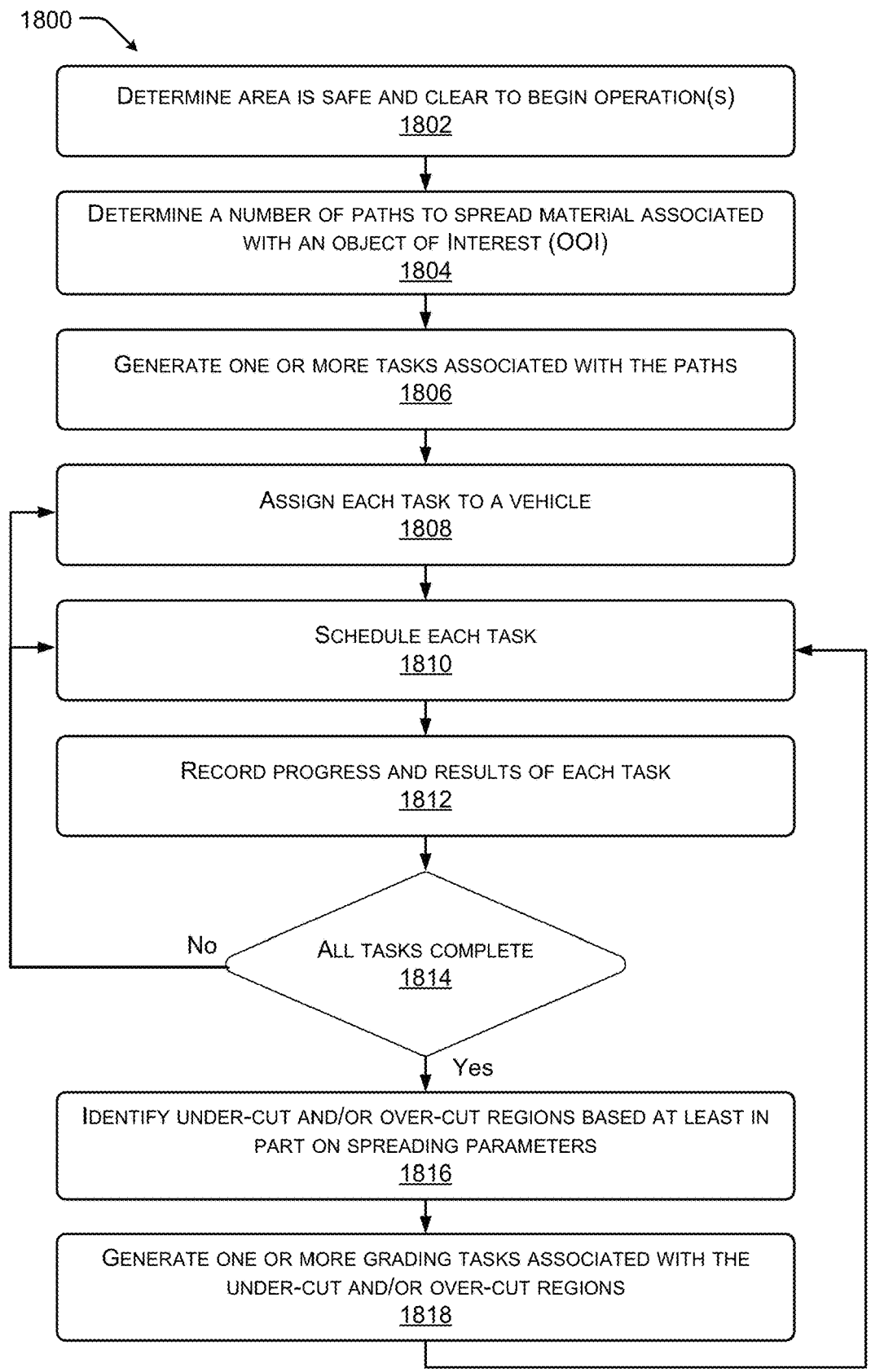
FIG. 18 is an example flow diagram showing an illustrative process for generating tasks associated with one or more objects of interest according to some implementations.

FIG. 18 is an example flow diagram showing an illustrative process 1800 for generating tasks and/or paths associated with one or more object of interest according to some implementations. For example, once an OOI is detected by the vehicle and the material volume is determined, the vehicle may proceed to define paths and spread the material over the area according to the spreading parameters, such as the depth and spreading height profile.

At 1802, the vehicle may determine the area is safe and clear to begin operations. For example, the vehicle may analyze image data captured substantially temporaneously to determine that no obstacles or individuals are within the area associated with the operations.

At 1804, the vehicle may determine a number of paths to spread the material associate with the OOI over an area. For example, the vehicle may determine the number of paths needed to spread out the materials, starting and ending locations of each path, machine engine, driving velocity and other control parameters associated with each path, blade height, angles and other control parameters associated with each path. In some cases, the paths may be defined based on vehicle characteristics (such as blade width and load), the spreading parameters (e.g., the spreading height profile), and the volume and physical location of the OOI.

At 1806, the vehicle may generate one or more tasks associated with the paths. For example, the tasks may include spreading the material, raising terrain, lowering terrain, etc. The tasks may be generated based on vehicle power, blade width, height, vehicle capacity, OOI volume, OOI location, OOI width, OOI height, target spreading direction, spreading depth, initial terrain elevation, spreading area constraints (such as permanent obstacles), etc. As one particular example, a particular task may include an operation type (such as material spreading), path details (such as starting and ending points, direction, and length), engine behavior (such as max power with gear set to forward at level 3), blade movement (e.g., raise from 0 to 0.2 meters tall in the first 3 meters, then maintain 0.2 meters height through the remaining), blade tilting, among others.

At 1808, the tasks are assigned to a vehicle. In some cases, the tasks may be assigned to the current vehicle. However, in other cases, the vehicle may assign the tasks to a second nearby vehicle, such as when the current vehicle cannot manage the load associated with spreading the material of the OOI.

At 1810, the tasks may be scheduled. For instance, the paths may be assigned an order as discussed above with respect to FIGS. 5-15. In some cases, the order may be from one side to the other (such as left to right or right to left). In other cases, the schedule may be based on additional information such as the delivery of each OOI by, for instance, a rock truck.

At 1812, the vehicle assigned to perform each task may record progress and results of each task. For example, the vehicle may track a profile of the terrain as the vehicle moves or spreads the material. The terrain profile may then be used as the results data. In some cases, the vehicle may track the pitch, roll, and yaw as well as a physical coordinate as the vehicle performs the operations of each task and use the collected data to generate the terrain profile. In some cases, the terrain profile may include a terrain elevation mapping associated with the area.

At 1814, the vehicle may determine if all tasks are complete. If all of the tasks are not complete, the process 1800 returns to 1808 or 1810 and additional tasks may be scheduled and/or assigned. If, however, each of the tasks are complete, the process 1800 advances to 1816.

At 1816, the vehicle identifies under-cut and/or over-cut regions based at least in part on the spreading parameters and/or the terrain profile. For example, the vehicle may compare the data collected during the operations and associated with the terrain (e.g., the terrain profile) and compare that with the spreading parameters (e.g., the spreading height profile) to determine if the terrain profile is within a threshold of the spreading height profile over the surface of the terrain.

At 1818, the vehicle may generate one or more grading tasks associated with the under-cut and/or over-cut regions. For instance, the vehicle may generate paths such as discussed above with respect to FIGS. 14 and 15. The grading tasks may include one or more paths to move the material associated with undercut regions to the overcut regions. Once the grading tasks are generated, the process 1800 may return to 1810 and schedule them.

Figure 19:
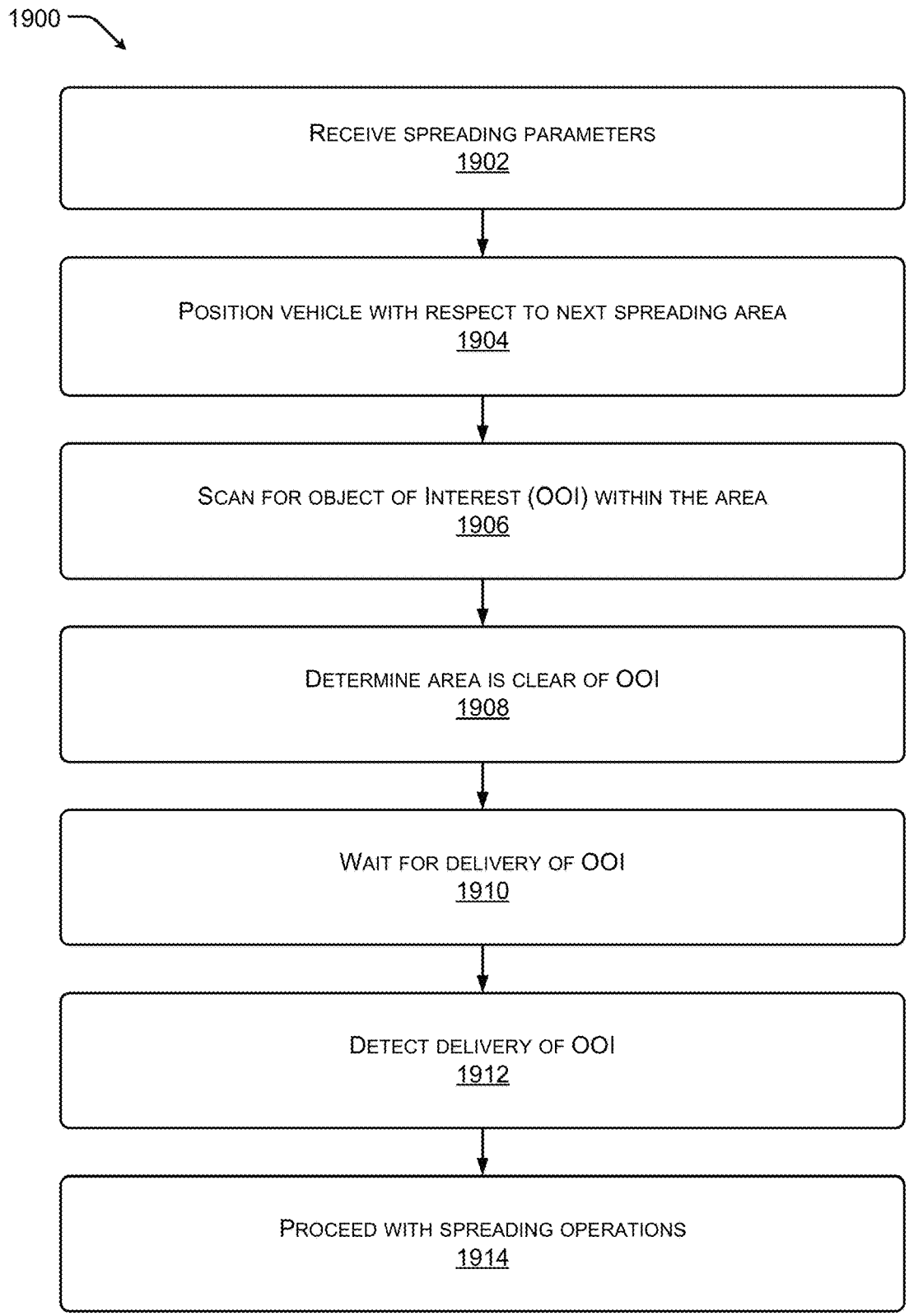
FIG. 19 is an example flow diagram showing an illustrative process for detecting delivery of objects of interests associated with an area according to some implementations.

FIG. 19 is an example flow diagram showing an illustrative process 1900 for detecting delivery of object of interests associated with an area according to some implementations. In some case, the material piles may be delivered by a rock truck as an autonomous vehicle, such as a bulldozer, spreads the material over the area.

At 1902, the vehicle may receive spreading parameters. For instance, the spreading parameters may include a spreading depth and spreading height profiles as discussed above with respect to FIG. 7.

At 1904, the vehicle may position itself with respect to the next spreading area or region. For example, the vehicle may alternate regions within a site such that the rock truck may deliver a pile of material to a first region while the vehicle is spreading on a second region. In other cases, the material piles may be located nearby each other, such as delivered along a predefined path within the site.

At 1906, the vehicle may scan or search for an OOI within the current area or region. For example, once the vehicle moves back to the first region the vehicle may capture image data and analyze the image data to identify the position or coordinate of the material pile and the characteristics of the material pile (e.g., contour profile and volume).

At 1908, the vehicle may determine the area or region is clear of an OOI. For example, the vehicle may arrive at the region ahead of the rock truck delivering the material pile.

At 1910, the vehicle may wait for the delivery of the OOI. For example, the vehicle may shut down or otherwise conserve power while no OOI is present in the region the vehicle is assigned. In other cases, the vehicle may process overcut or undercut regions, perform finishing tasks, etc. while waiting for the delivery of the next OOI.

At 1912, the vehicle may detect the delivery of the OOI. For example, the vehicle may detect the motion of the rock truck. In another example, the vehicle may periodically or substantially continuously scan the region for an OOI. Upon detection, the process advances to 1914, the vehicle proceeds with spreading operations. In other examples, the vehicle may detect the presence of the dump truck, presence of the OOI, or receive a notification from the dump/rock truck.

Figure 20:
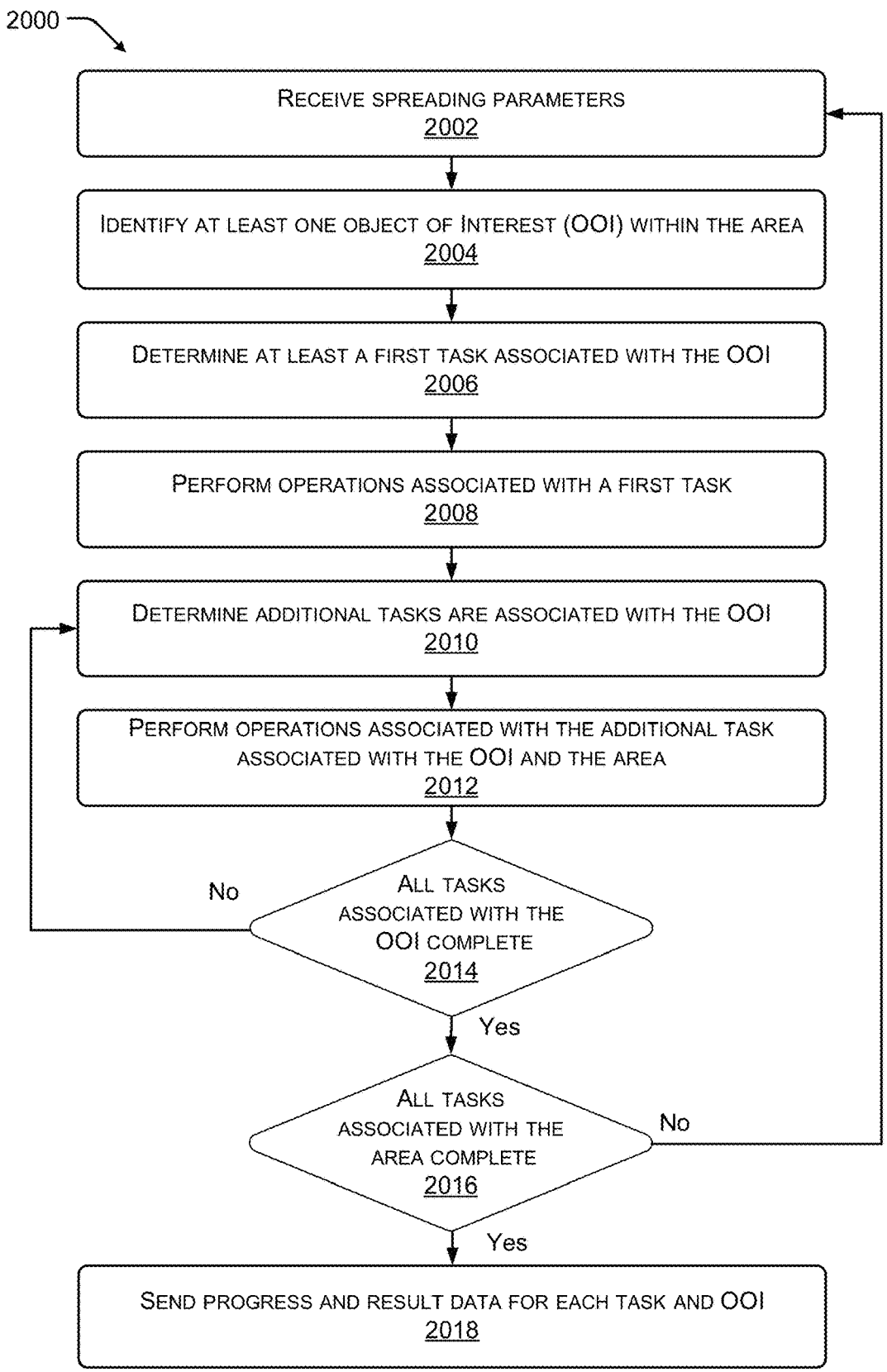
FIG. 20 is an example flow diagram showing an illustrative process for performing operations associated with tasks corresponding to an area according to some implementations.

FIG. 20 is an example flow diagram showing an illustrative process 2000 for performing operations associated with tasks corresponding to an area according to some implementations. As discussed above, the area or region at which an autonomous vehicle is assigned may include multiple OOI that should be treated for task generation purposes as a single OOI.

At 2002, the vehicle may receive spreading parameters. For instance, the spreading parameters may include a spreading depth and spreading height profiles as discussed above with respect to FIG. 7.

At 2004, the vehicle may identify at least one OOI within the area. For example, the vehicle may scan or search for an OOI within the current area or region. In some cases, the vehicle may utilize one or more image devices including 2D image devices, 3D image device, and/or depth sensors.

At 2006, the vehicle may determine at least a first task or path associated with the OOI. For example, the vehicle may define a first path associated with spreading the material of the OOI. In some cases, the first task may be generated based on vehicle power, blade width, height, vehicle capacity, OOI volume, OOI location, OOI width, OOI height, target spreading direction, spreading depth, initial terrain elevation, spreading area constraints (such as permanent obstacles), etc.

At 2008, the vehicle may perform operations associate with the first task. For example, the vehicle may spread the material according to the defined path and the spreading depth.

At 2010, the vehicle may determine that additional tasks are associated with the OOI, and, at 2012, the vehicle may perform the operations associated with the additional task. For example, the vehicle may perform a second pass over the material of the OOI spreading according to a second path, as discussed above.

At 2014, the vehicle determines of all tasks associated with the OOI are complete. If not, the process 2000 returns to 2010 and the vehicle determines if any additional tasks are associated with the OOI. If, however, all of the tasks are complete, the process 2000 advances to 2016.

At 2016, the vehicle may determine if all tasks associated with the area are complete. For instance, the vehicle may complete the operations with respect to the first OOI prior to a second OOI being delivered. In this example, the vehicle may wait as additional tasks associated with the area and the second OOI are not completed. If, additional tasks are to be completed, the process 2000 returns to 2002 and receives or checks the spreading parameters. However, if all tasks associated with the area are complete, the process 2000 moves to 2018.

At 2018, the vehicle may send progress and result data for each task and OOI. In some cases, the vehicle may track a profile of the terrain as the vehicle completes each task. For instance, the data may be collected as the vehicle moves or spreads the material over the area using one or more IMUs or sensors, such as via undercarriage positions sampling. In another example, the data may be collected using the image capture device and LiDAR systems. The terrain profile may then be used as the results data. In some cases, the vehicle may track the pitch, roll, and yaw as well as a physical coordinate as the vehicle performs the operations of each task and use the collected data to generate the terrain profile. In some cases, the terrain profile may include a terrain elevation mapping associated with the area.

Figure 21:
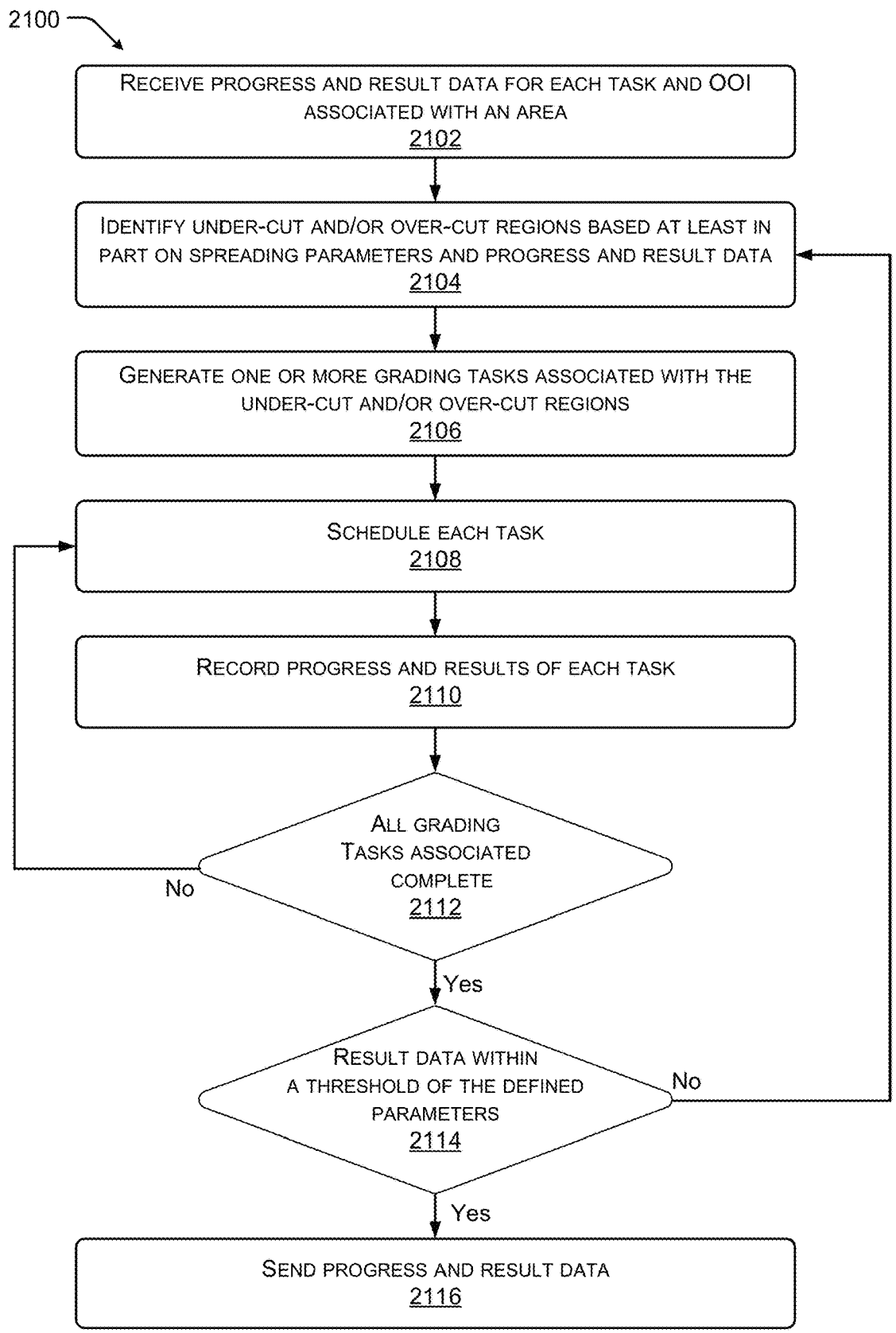
FIG. 21 is an example flow diagram showing an illustrative process for generating tasks after spreading operations are complete within an area with according to some implementations.

FIG. 21 is an example flow diagram showing an illustrative process 2100 for generating tasks after spreading operations are complete within an area with according to some implementations. For example, as discussed above, after spreading operations associated with an area are complete. The terrain profile generated from the data collected by the autonomous vehicle may indicate that some areas have been over-cut and some have been under-cut with respect to the spreading parameters.

At 2102, the vehicle may receive progress and result data for each task and OOI associated with an area and, at 2104, the vehicle may identify under-cut and/or over-cut regions based at least in part on the spreading parameter and the progress and result data. For example, the vehicle may compare the progress and result data with the spreading parameters to determine the under-cut and/or over-cut regions. In one specific example, the vehicle may compare the spreading height profile with the terrain profile generated from the progress and result data to determine if the difference is greater than a threshold.

At 2106, the vehicle may generate one or more grading tasks associated with the under-cut and/or over-cut regions. For instance, the vehicle may generate grading paths such as discussed above with respect to FIGS. 12 and 13. The grading tasks may include one or more paths to move the material associated with undercut and overcut spots.

At 2108, the vehicle may schedule the grading tasks. For instance, the grading paths may be assigned an order as discussed above with respect to FIGS. 5-15. In some cases, the order may be from one side to the other (such as left to right or right to left).

At 2110, the vehicle may record progress and results of each task. For example, the vehicle may track a profile of the terrain as the vehicle moves or spreads the material. The terrain profile may then be used as the results data. In some cases, the vehicle may track the pitch, roll, and yaw as well as a physical coordinate as the vehicle performs the operations of each task and use the collected data to generate the terrain profile. In some cases, the terrain profile may include a terrain elevation mapping associated with the area.

At 2112, the vehicle may determine if all grading tasks are complete. If all of the grading tasks are not complete, the process 2100 returns to 2106 and additional task may be scheduled and/or assigned. If, however, each of the tasks are complete, the process 2100 advances to 2114.

At 2114, the vehicle determines if the result data is within a threshold of the spreading parameters. For example, the vehicle may compare the data collected during the operations and associated with the terrain (e.g., the terrain profile) and compare that with the spreading parameters (e.g., the spreading height profile) to determine if the terrain profile is within a threshold of the spreading height profile over the surface of the terrain. If the result data is not within the threshold at any location or portion of the region, the process 2100 returns to 2104 and the vehicle may again identify under-cut and/or over-cut regions based at least in part on the spreading parameters and/or the terrain profile. However, if the result data is within the threshold, the process 2100 proceeds to 2116.

At 2116, the vehicle may send the progress and result data to, for instance, a remote system or cloud-based service. In some cases, the data sent may include an alert or notification for an operator to review the progress and result data and sign off that the spreading operations associated with the region or area are complete.

Figure 22:
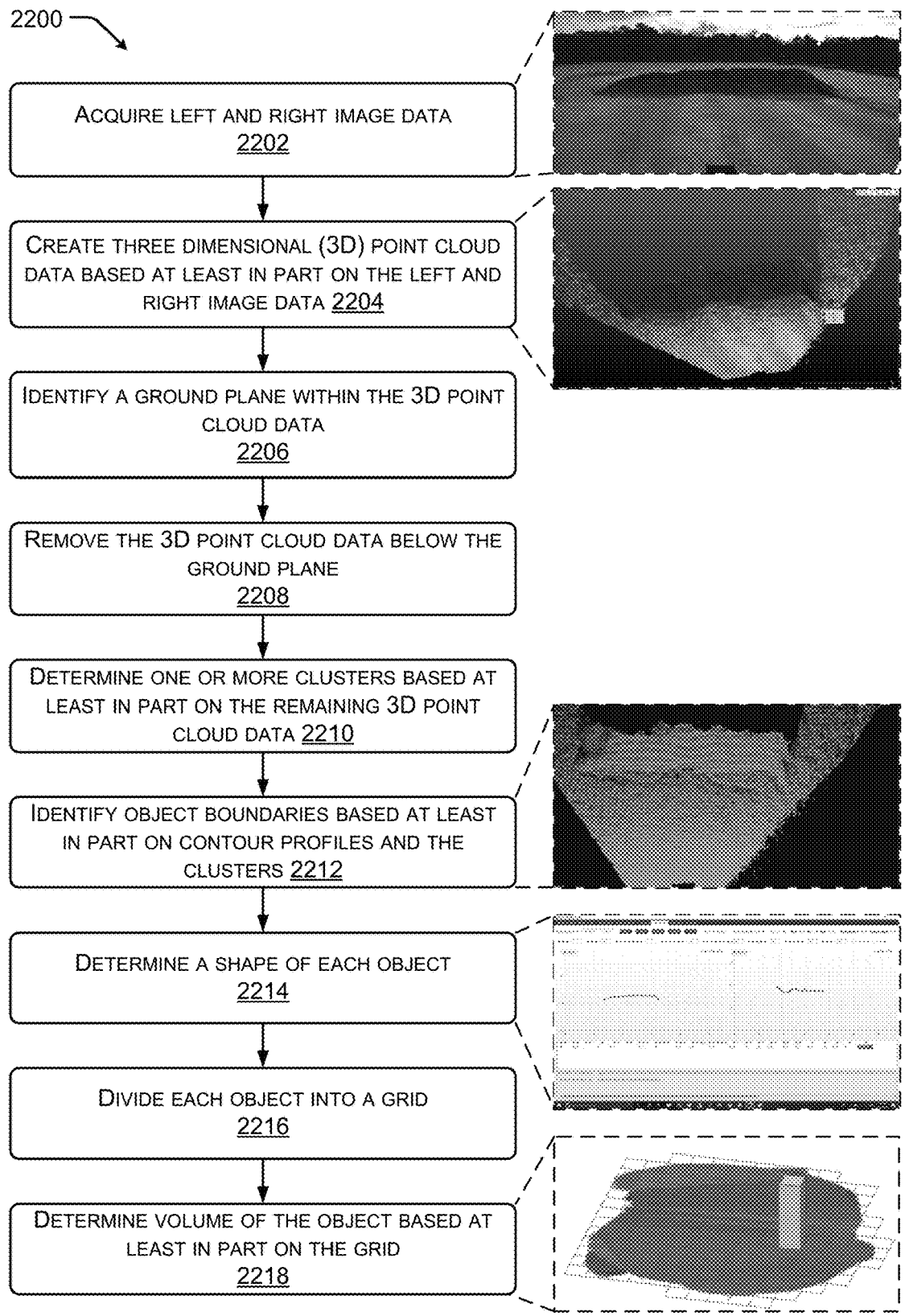
FIG. 22 is an example flow diagram showing an illustrative process for volume calculation of an object of interest according to some implementations.

FIG. 22 is an example flow diagram showing an illustrative process 2200 for volume calculation of an object of interest according to some implementations. In various instances, the vehicle or the system may detect a new material pile or OOI. In these instances, the vehicle may determine the volume of the material pile prior to calculating spreading paths.

At 2202, the vehicle acquires the left and right image data. For example, the image data may be capture by a stereo vision system or a 3D LiDAR system. In other example, the system may receive the image data from a secondary or third-party device or system.

At 2204, the vehicle may create 3D point cloud data based at least in part on the left and right image data and, at 2206, the vehicle may identify a ground plane within the 3D point cloud data. In other case, the ground plane may be a cutoff plane defined by an operator.

At 2208, the vehicle may remove 3D point cloud data below the ground or cutoff plane and, at 2210, the vehicle may determine one or more clusters based at least in part on the remaining 3D point cloud data. For example, the vehicle may group the remaining point cloud data into clusters and filter outliers (e.g., points that do fit within a cluster).

At 2212, the vehicle may identify object boundaries based at least in part on the contour profiles and the clusters. For example, the vehicle may find the object boundaries using the clusters and then abstract out the 3D contour profiles from the 3D boundaries of the clusters.

At 2214, the vehicle may determine a shape of each object based at least in part on the contour profiles. For example, the vehicle may filter and project the 3D contour profiles into a 2D plane to determine the shape of each object.

At 2216, the vehicle may divide each object into a grid. For example, the vehicle may select a ground sample distance to a discrete point and divide the object point cloud data into grids using the ground sample distance.

At 2218, the vehicle may determine the volume of the object based at least in part on the grid. For example, the vehicle may calculate the volume for each grid quadrant and then add the volume of each grid quadrant associated with the object to determine the volume of the object.

Figure 23:
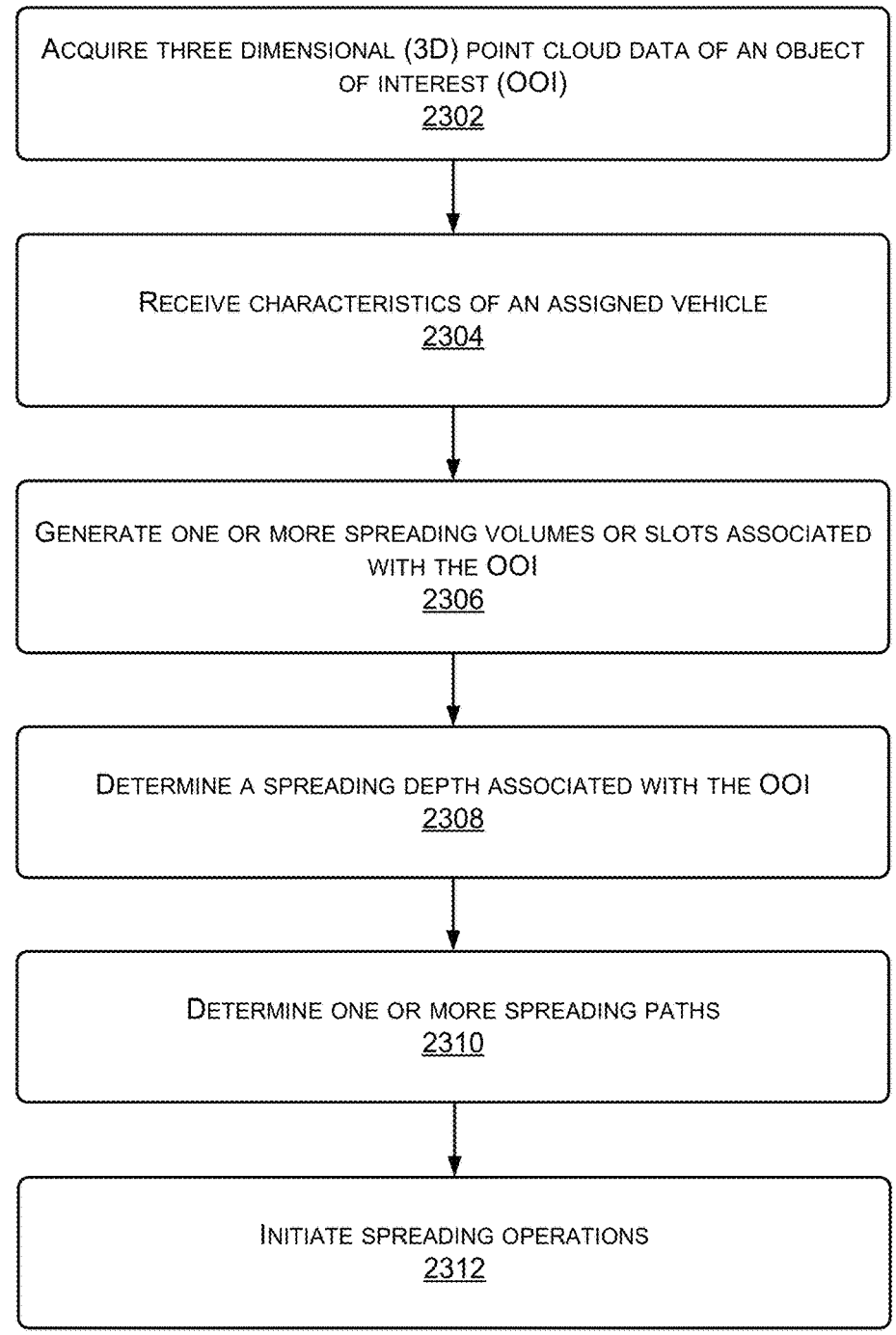
FIG. 23 is an example flow diagram showing an illustrative process for static path generation according to some implementations.

FIG. 23 is an example flow diagram showing an illustrative process 2300 for static path generation according to some implementations. For instance, as illustrated above with respect to FIG. 12, the vehicle or system may determine each spreading path associated with a material pile or OOI from initial scans or image data collected prior to spreading operating commencing.

At 2302, the vehicle or system may acquire 3D point cloud data of an OOI. For example, image data may be capture by a stereo vision system or a 3D LiDAR system. The left and right image data may then be converted into 3D point cloud data associated with an OOI.

At 2304, the vehicle or system may receive characteristics of the assigned vehicle. For example, the characteristics may include blade angle, blade width, blade height, blade capacity or volume, machine power, etc.

At 2306, the vehicle may generate one or more spreading volumes or slots associated with the OOI. For example, the spreading volumes or slots may be generated based at least in part on the 3D point cloud data of the OOI and the characteristics of the assigned vehicle. In one particular instance, the spreading volumes or slots may be determined based on blade volume, material volume, material height, material width, material density, material composition, and/or material hardness.

At 2308, the vehicle may determine a spreading depth associated with the OOI. For example, the spreading depth may be based at least in part on the desired finishing profile and/or the spreading height profile as well as other task requirements, such as job completion date.

At 2310, the vehicle may determine one or more spreading paths. For example, the vehicle may identify the paths based on the spreading depth, the amount or size of the material associated with the OOI, and/or the characteristics of the vehicle.

At 2312, the vehicle may initiate spreading operations. At this time, the vehicle may spread the material based on the paths determined at 2310.

Figure 24:
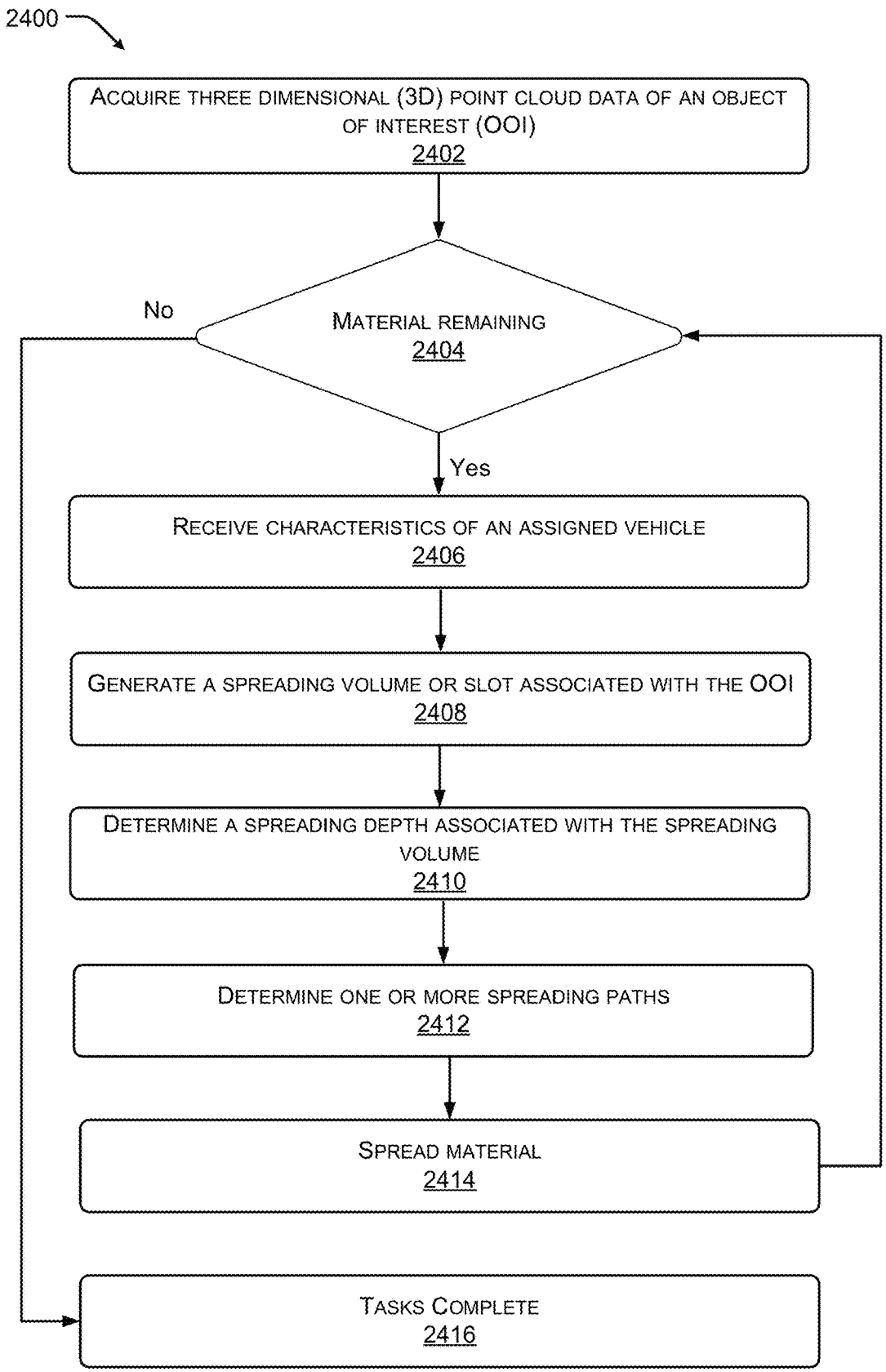
FIG. 24 is an example flow diagram showing an illustrative process for dynamic path generation according to some implementations.

FIG. 24 is an example flow diagram showing an illustrative process 2400 for dynamic path generation according to some implementations. In some cases, the path generation may be dynamic or preformed following the completion of each spreading path. In this manner, the spreading tasks may be performed in a more flexible style, as each path may be based on the remaining material of the OOI, the currently spread material, the desired finishing profile, and/or the finished surface data collected with regards to the terrain during operations associated with each spreading path. For instance, the spreading path may be configured based on a comparison of the finishing profile or desired spreading depth and the finished surface data collected on the terrain during operations of the previous spreading path.

At 2402, the vehicle or system may acquire 3D point cloud data of an OOI. For example, image data may be capture by a stereo vision system or a 3D LiDAR system. The left and right image data may then be converted into 3D point cloud data associated with an OOI.

At 2404, the vehicle may determine if any material of the OOI remains. If no material remains the process 2400 proceeds to 2416 and the tasks associated with the current OOI are complete. However, if material remains, then the process 2400 advances to 2406.

At 2406, the vehicle or system may receive characteristics of the assigned vehicle. For example, the characteristics may include blade angle, blade width, blade height, blade capacity or volume, machine power, etc.

At 2408, the vehicle may generate a spreading volume or slot associated with the OOI. For example, the spreading volume or slot may be generated based at least in part on the 3D point cloud data of the OOI, the amount of material remaining, and/or the characteristics of the assigned vehicle. In one particular instance, the spreading volume or slot may be determined based on blade volume, material volume, material height, material width, material density, material composition, and/or material hardness.

At 2410, the vehicle may determine a spreading depth associated with the spreading volume. For example, the spreading depth may be based at least in part on the desired finishing profile, the material being spread, and/or the spreading height profile as well as other task requirements, such as job completion date.

At 2412, the vehicle may determine a spreading path and, at 2414, the vehicle may spread the material based on the path. For example, the vehicle may identify the paths based on the spreading depth, the amount or size of the material associated with the speeding volume, and/or the characteristics of the vehicle.

Figure 25:
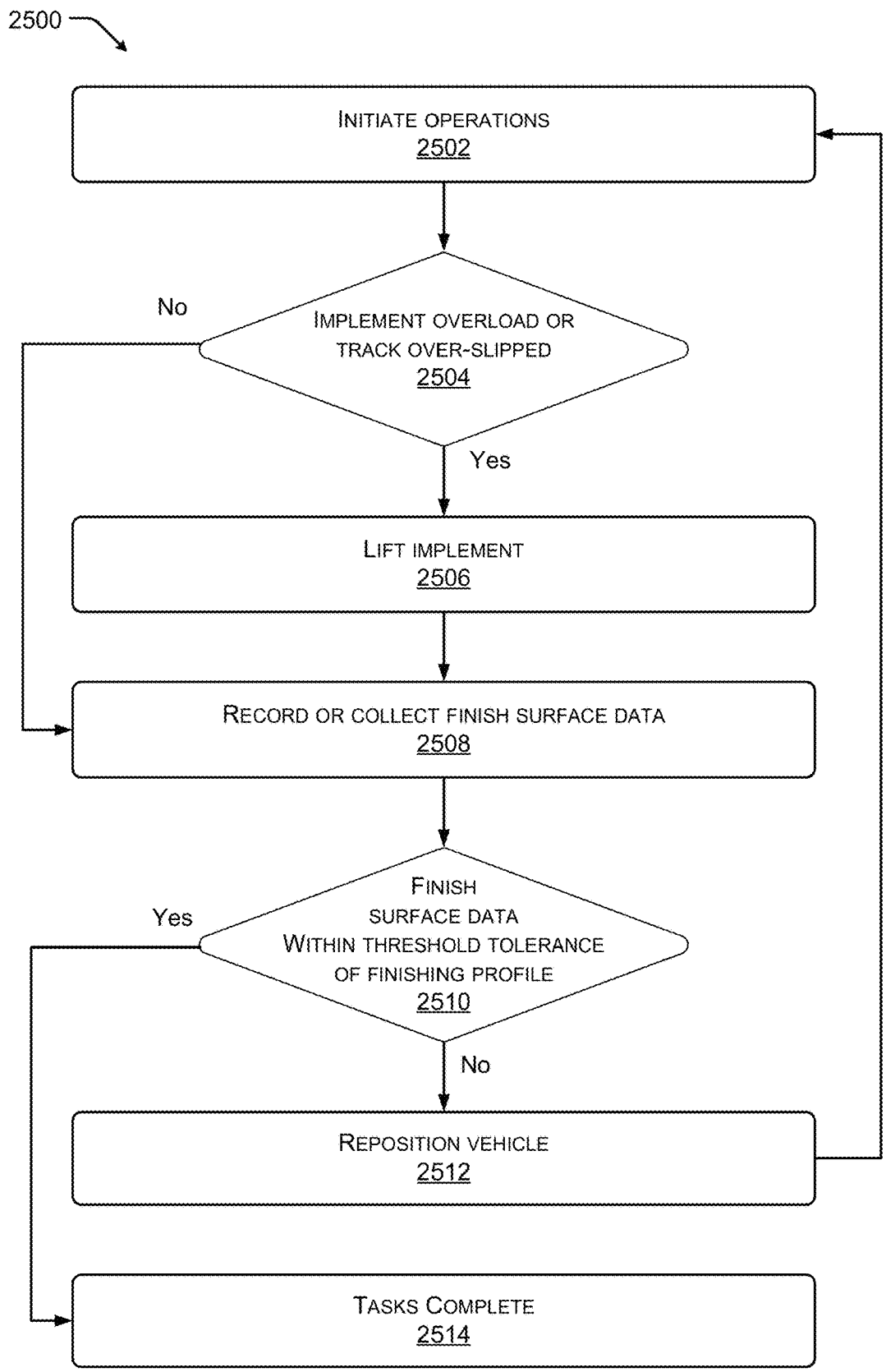
FIG. 25 is an example flow diagram showing an illustrative process for performing finishing passes associated with the spreading operations according to some implementations.

FIG. 25 is an example flow diagram showing an illustrative process 2500 for performing finishing passes associated with the spreading operations according to some implementations. In some cases, as the vehicle spreads the material or performs operations associated with a spreading path, the vehicle may experience implement overload or track over-slip. In these cases, the vehicle may adjust the load and perform additional passes along the path to achieve the desired finishing profile or spreading depth.

At 2502, the vehicle may initiate operations. For instance, as discussed above, the vehicle or a system may determine one or more spreading paths associated with an OOI. The vehicle may then initiate spreading operations according to the defined paths.

At 2504, the vehicle may experience implement overload or track over-slip during operations associated with a current path. If the vehicle does experience implement overload or track over-slip, the process 2500 proceeds to 2506. Otherwise, the process 2500 advances to 2508.

At 2506, the vehicle may lift the implement to reduce the overload and/or over-slip. For instance, by lifting the implement the amount of material being processed is reduced and thereby the load is reduced.

At 2508, the vehicle may record or collect finish surface data. In one example, the vehicle may record or log the finish surface data using on board sensors (such as IMUs) or image capture devices. After each finishing pass, the vehicle may compare the log of the finish surface to the finishing profile and/or the spreading height profile to determine if another pass is required.

At 2510, the vehicle may determine if the finish surface data is within a threshold tolerance of the finishing profile or spreading height profile. If the finishing surface data indicates that the terrain is within the threshold tolerance, then the process 2500 proceeds to 2514 and the tasks are complete. However, if the finish surface data is not within the threshold tolerance, such as due to an implement overload and implement position adjustment, then the process 2500 advances to 2512.

At 2512, the vehicle may reposition. For instance, the vehicle may return to the initial starting point associated with the current path. In other instances, the vehicle may realign based on the finishing profile data, the remaining material of the OOI, and comparison between the finishing profile data and the finishing profile. After repositioning, the process 2500 returns to 2502.

Figure 26:
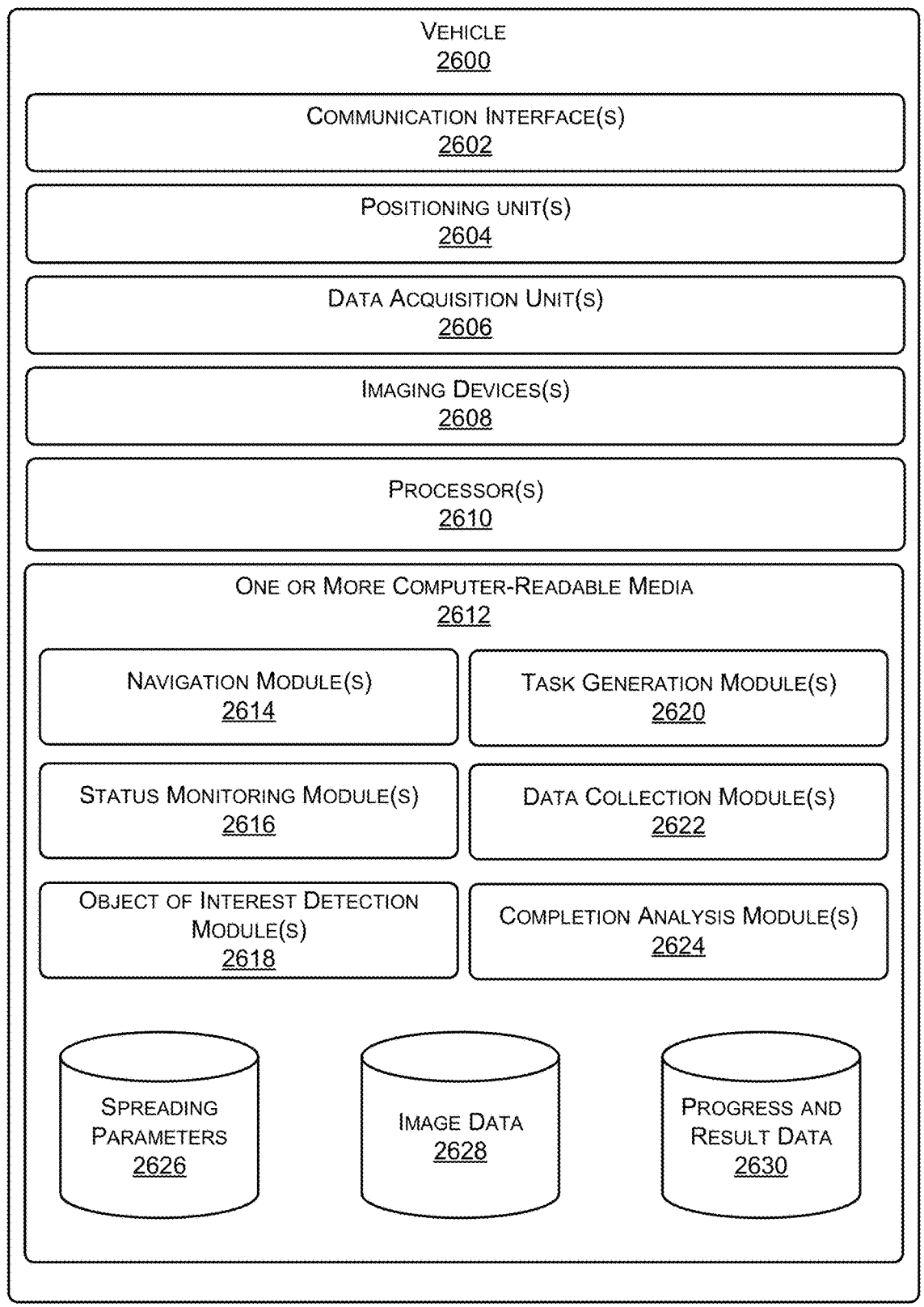
FIG. 26 illustrates example components associated with a control unit on an autonomous vehicle according to some implementations.

FIG. 26 illustrates example components associated with a control unit on an autonomous vehicle according to some implementations. In the illustrated example, the vehicle or vehicle control unit 2600 may be coupled to or include one or more communication interfaces 2602. The vehicle 2600 unit may also be coupled to or include one or more positioning units 2604, and one or more data acquisition units 2606 and one or more imaging devices 2608 for collecting data usable for autonomous control of a vehicle, monitoring of terrain, and/or detection of OOIs.

The communication interfaces 2602 may support both wired and wireless connection to various networks, such as cellular networks, radio networks (e.g., radio-frequency identification (RFID)), WiFi networks, short-range or near-field networks (e.g., Bluetooth®), infrared signals, local area networks, wide area networks, the Internet, and so forth. For example, the communication interfaces 2602 may allow the vehicle 2600 to receive data, such as spreading parameters, from a cloud-based or other remote system, such as an electronic device associated with an operator.

The positioning units 2604 may include one or more sensor package combinations including GNSS sensors. In some cases, the positioning units 2604 may be disposed on the top of the vehicle body and include one or more antennas for receiving satellite signals and one or more receivers or other components for decoding the satellite signals and determining a global position of the positioning units 2604. In some cases, the satellite signals received by a GNSS sensor may be in various formats or standards, such as GPS, GLONASS, Galileo, BeiDou as well as other satellite navigation standards.

In some cases, the data acquisition units 2606 may include one or more accelerometers, one or more gyroscopes, one or more magnetometers, and/or one or more pressure sensors, among other sensors. In one particular example, the data acquisition units 2606 may include an internal measurement units (IMU) sensor or package. For instance, an IMU sensor or package may include three accelerometers placed orthogonally to each other, three rate gyroscopes placed orthogonally to each other, three magnetometers placed orthogonally to each other, and a barometric pressure sensor. In general, the data acquisition units 2606 are configured to collect data associated with the movement, tilt, pitch, yaw, and acceleration of the vehicle and conditions of the terrain during operations.

The imaging units 2608 may include one or more cameras or other image components usable to collect data associated with the surrounding environment. For example, vehicle 2600 may be equipped with stereo vision and/or LiDAR vision systems for detecting the OOI as well as unexpected obstacles. In some cases, the stereo vision system may include two or more 2D image devices configured to capture image data of an overlapping area or space. The overlapping images may then be used to generate a 3D point cloud.

The vehicle 2600 may also include processing resources, as represented by processors 2610, and computer-readable storage media 2612. The computer-readable storage media 2612 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instructions, data stores, and so forth may be stored within the computer-readable media 2612 and configured to execute on the processors 2610. For example, a navigation module 2614, a status monitoring module 2616, an object of interest detection module 2618, a task generation module 2620, a data collection module 2622, and a completion analysis module 2624. In some implementations, the computer-readable media 2612 may store data, such as spreading parameters 2626, image data 2628, and progress and result data 2630. The spreading parameters 2626 may be user defined based on the site or terrain data. In some cases, the spreading parameters 2626 may include a finishing or spreading height profile, spreading depth, among others. The image data 2628 may include the 2D image data and/or the 3D cloud point data collected by the vehicles performing the operations. In some instances, the image data 2628 may be used by the OOI detection module 2618 and/or the task generation module 2620. The progress and result data 2624 may include the data associated with the terrain after the spreading operations are completed.

The navigation module 2614 may be configured to receive data associated with the environment from the various positioning units 2604, data acquisition units 2606, and/or image devices 2608 and to cause the vehicle to move and perform operations associated with the assigned region or area. For example, the navigation module 2614 may be configured to cause the vehicle to move along the defined paths while spreading the material associated with an OOI.

The status monitoring module 2616 may be configured to receive data associated with the environment from the various positioning units 2604, data acquisition units 2606, and/or image devices 2608 to determine the status of the vehicle and progress associated with the current task. For example, the status motoring module 2616 may perform a health check on the vehicle 2600 by causing the vehicle to perform one or more test tasks before initiating operations associated with a spreading task. In some cases, the status monitoring module 2616 may determine if the vehicle 2600 if capable of performing the task or in good working condition based on a performance associated with the test tasks.

The object of interest detection module 2618 may be configured to receive the image data from the image devices 2608 and to determine a physical position and various characteristics of an OOI by processing the image data. For example, the object of interest detection module 2618 may locate the OOI within a scene representative of the physical environment within 2D image data of the physical environment. The object of interest detection module 2618 may then determine a scale using 3D cloud point data of the environment with respect to the 2D image data. Once the OOI is scaled the object of interest detection module 2618 may determine various characteristics such as contour profile, volume, height, width, material type, among others.

The task generation module 2620 may be configured to generate tasks and/or paths associated with the OOI detected by the object of interest detection module 2618 based at least in part on the objects characteristics, vehicle data, terrain data, and/or a combination thereof. In some cases, the task generation module 2620 may order the paths or tasks. In still other cases, the task generation module 2620 may treat multiple OOI as a single OOI for task and path generation purposes.

The data collection module 2622 may be configured to collect data associated with the terrain and the spreading operations as the operations are performed by the vehicle 2600. For example, the data collection module 2622 may collect the progress and result data 2630 using the position units 2604, data acquisition units 2606, and/or the image device 2608. In some cases, the progress and result data 2630 generated by the data collection module 2622 may include the surface profile or terrain profile that resulted from the completion of the spreading operations.

The completion analysis module 2624 may be configured to compare the spreading parameters 2626 associated with a region or area with the progress and result data 2630 also associated with the region or area and to determine if they are within a threshold of difference. For example, the completion analysis module 2624 may identify any under-cut or over-cut areas within the region or area based on the result data 2630 and the spreading parameters 2626. In other examples, the completion analysis module 2624 may determine that the spreading operations may be completed and cause the progress and result data 2630 to be provided to a cloud-based or remote computing device, for instance, for review by a site operator.

Figure 27:
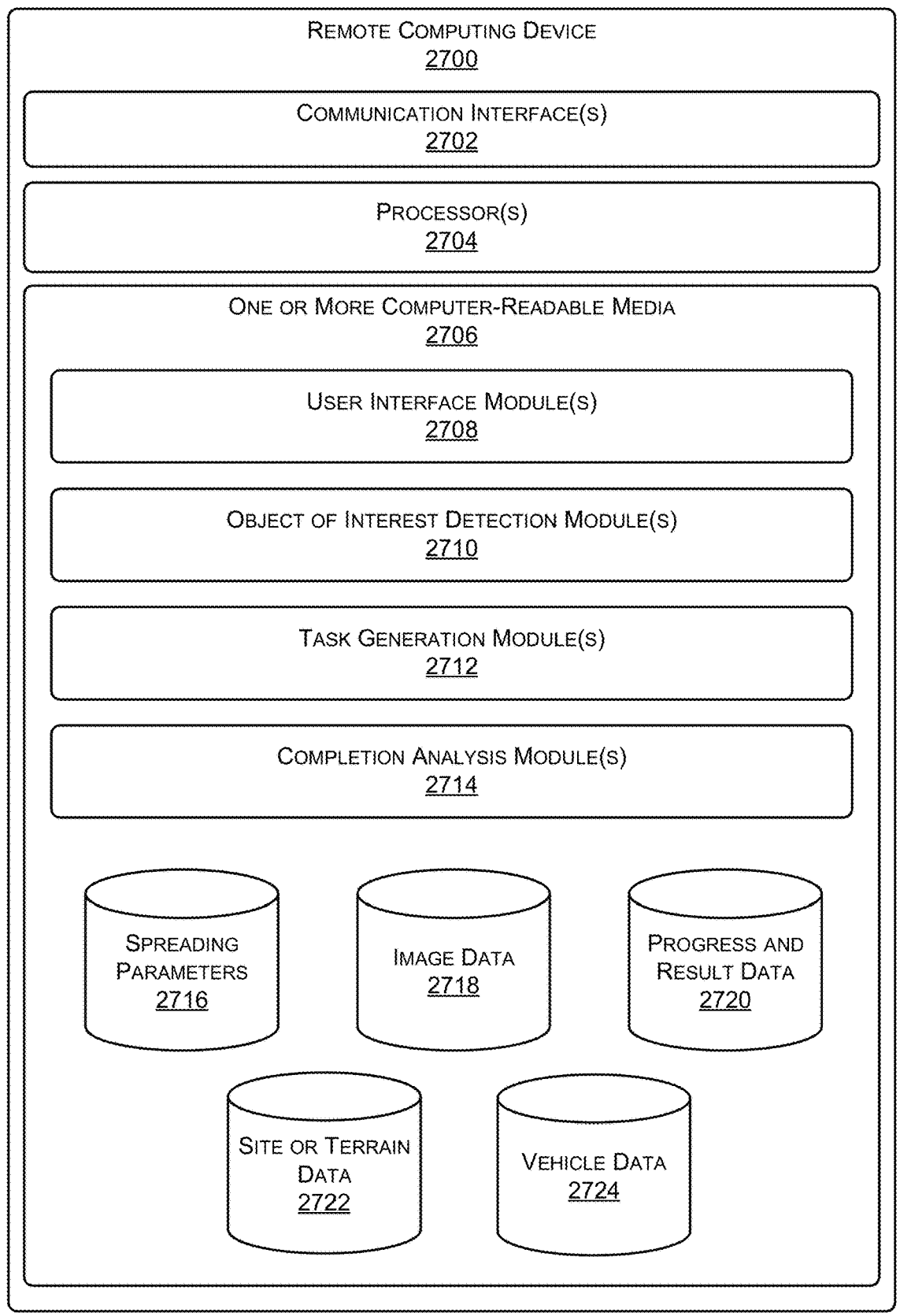
FIG. 27 illustrates example components of one or more servers associated with a remote computing device in communication with an autonomous vehicle performing spreading operations according to some implementations.

FIG. 27 illustrates example components of one or more servers associated with a remote computing device 2700 in communication with an autonomous vehicle performing spreading operations according to some implementations. For example, the computing device 2700 may be in communication with a control unit installed on the vehicle. In some cases, the computing device 2700 may generate and send the spreading parameters to the vehicle as well as to assist with image processing, OOI detection, and/or task generation.

In the illustrated example, the remote computing device 2100 includes communication interfaces 2702 that may support both wired and wireless connection to various networks, such as cellular networks, radio networks (e.g., radio-frequency identification (RFID)), WiFi networks, short-range or near-field networks (e.g., Bluetooth®), infrared signals, local area networks, wide area networks, the Internet, and so forth. For example, the communication interfaces 2702 may exchange data, such as spreading parameters, with the control unit of the vehicle or with a vehicle itself.

The remote computing device 2700 may also include processing resources, as represented by processors 2704, and computer-readable storage media 2706. The computer-readable storage media 2706 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instructions, data stores, and so forth may be stored within the computer-readable media 2706 and configured to execute on the processors 2704. For example, a user interface module 2708, OOI detection module 2710, task generation module 2712, and completion analysis module 2714. In some implementations, the computer-readable media 2706 may store data, such as spreading parameters 2716, image data 2718 of a site captured by a vehicle performing spreading operations, progress and result data 2720 received from the vehicle, and site or terrain data 2722, and/or vehicle data 2724.

The spreading parameters 2716 may be user defined based on the site or terrain data 2722. In some cases, the spreading parameters 2716 may include a finishing or spreading height profile, spreading depth, among others. The image data 2718 may include the 2D image data and/or the 3D cloud point data collected by the vehicles performing the operations. In some instances, the image data 2718 may be used by the OOI detection module 2710 and/or the task generation module 2712 to assist the vehicle in locating OOIs and generating tasks or paths associated with each OOI. The progress and result data 2720 may include the data associated with the terrain after the spreading operations are completed. The terrain data 2722 may include information known about the terrain or location the vehicle is currently transforming. For example, the terrain data 2722 may include geological surveys and maps, ground type, height and elevation data, flora and fauna associated with the terrain, any improvements or obstacles associated with the terrain, current task being performed on the terrain (e.g., gravel production, mining, logging, etc.), vehicle list assigned to the terrain, boundaries, among others. The vehicle data 2724 may include information known about the vehicle, such as power output range, driving speed range, working tool or implement capacity, vehicle dimensions, vehicle weight, ground pressure, range of steering radius, maintenance history, operation or task logs, location, current assignments, last repair visit, stored health, status, or operational data, among others.

The user interface module 2708 may be configured to allow a user to generate or define the spreading parameters 2726. In some cases, the user interface may be presented on a display as well as receive user inputs, such as via a touch enabled display. In some cases, the user interface module 2708 may also cause additional information to be presented on the display. For instance, the user interface module 2708 may display the site or terrain data 2722 as well as vehicle data 2724 to assist the user in defining the spreading parameters. The user interface module 2708 may also present the progress and result data 2720 to the user such that the user may determine if the results of the spreading operations are acceptable.

The OOI detection module 2710 may be configured to receive the image data 2718 from the vehicles and to determine a physical position and various characteristics of an OOI by processing the image data. For example, the OOI detection module 2710 may locate the OOI within a scene representative of the physical environment within 2D image data of the physical environment. The OOI detection module 2710 may then determine a scale using 3D cloud point data of the environment with respect to the 2D image data. Once the OOI is scaled, the OOI detection module 2710 may determine various characteristics such as contour profile, volume, height, width, material type, among others.

The task generation module 2712 may be configured to generate task and/or paths associated with the OOI detected by the object of interest detection module 2712 based at least in part on the objects characteristics, vehicle data 2724, terrain data, and/or a combination thereof. In some cases, the task generation module 2712 may order the paths or tasks. In still other cases, the task generation module 2712 may treat multiple OOI as a single OOI for task and path generation purposes.

The completion analysis module 2714 may be configured to compare the spreading parameters 2716 associated with a region or area with the progress and result data 2720 also associated with the region or area and to determine if they are within a threshold of difference. For example, the completion analysis module 2714 may identify any under-cut or over-cut areas within the region or area based on the result data 2720 and the spreading parameters 2716. In other example, the completion analysis module 2714 may determine that the spreading operations may be completed and cause the progress and result data 2720 to be provided to a cloud-based or remote computing device, for instance, for review by a site operator.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
under control of one or more processors configured with executable instructions,
receiving a two-dimensional image data of a region at a vehicle;
detecting a first object of interest within the two-dimensional image data, the first object of interest remote from the vehicle;
detecting a second object of interest within the two-dimensional image data;
receiving three-dimensional point cloud data;
determining, based at least in part on the two-dimensional image data and three-dimensional point cloud data, a first location of the first object of interest within a physical environment;
determining, based at least in part on the two-dimensional image data and three-dimensional point cloud data, a second location of the second object of interest within the physical environment;
determining, based at least in part on the three-dimensional point cloud data, a volume and a shape of the first object of interest;

determining a distance between the first object of interest and the second object of interest based at least in part on the first location and the second location;

generating one or more spreading tasks associated with the first object of interest based at least in part on the first location, the volume, the shape, and the distance, the one or more spreading tasks including instructions or data to cause the vehicle to spread material associated with the first object of interest over at least a portion of the region;

performing operations associated with the one or more spreading tasks;

collecting terrain data associated with a surface of the terrain of the region while performing operations associated with the one or more spreading tasks; and sending the terrain data to a remote device.

2. The method as recited in claim 1, further comprising determining the region is safe and clear prior to performing the operations associated with the one or more tasks.

3. The method as recited in claim 1, further comprising determining that the operations for each task associated with the region are complete prior to sending the terrain data.

4. The method as recited in claim 1, further comprising:
identifying an under-cut area within the region from the terrain data;
identifying an over-cut area within the region from the terrain data;
generating, in response to identifying the under-cut area and the over-cut area, at least one grading task associated with filling the under-cut area with material from the over-cut area;
collecting additional terrain data associated with the surface of the terrain of the region while performing the operations associated with the at least one grading task; and
sending the additional terrain data to the remote device.

5. The method as recited in claim 1, wherein determining the first location of the first object of interest within the physical environment further comprises translating a two-dimensional pixel position within the two-dimensional image data to a three-dimensional position within the physical environmental based at least in part on the three-dimensional point cloud data.

6. The method as recited in claim 1, wherein determining the distance between the first object of interest and the second object of interest further comprises:
determining, based at least in part on the two-dimensional image data, a pixel distance between the first object of interest and the second object of interest; and
determining, based at least in part on the pixel distance and the three-dimensional point cloud data, the distance.

7. The method as recited in claim 1, further comprises determining, based at least in part on the three-dimensional point cloud data, a second volume and a second shape of the second object of interest.

8. A method comprising:
under control of one or more processors configured with executable instructions,
receiving two-dimensional image data of a region of a physical environment;
receiving three-dimensional point cloud data of the region of the physical environment;
detecting a first material pile and a second material pile within the two-dimensional image data;
determining first physical characteristics of the first material pile and second physical characteristics of the second material pile within the region based at least in part on the two-dimensional image data and the three-dimensional point cloud data;
generating a spreading task including a first spreading path overlapping between the first material pile and the second material pile based at least in part on the first physical characteristics, the second physical characteristics, and spreading parameters associated with the region of the physical environment;
causing a vehicle to perform operations associated with the first spreading path, the operations including spreading at least a portion of first material of the first material pile and at least a portion of second material of the second material pile along the first spreading path; and
collecting terrain data associated with a surface of the terrain of the region while spreading the material.

9. The method as recited in claim 8, wherein the spreading task includes a second spreading path associated with spreading the material of the first material pile and a third spreading path associated with spreading the material of the second material pile.

10. The method as recited in claim 9, wherein the vehicle is configured to perform operations associated with the second path prior to performing operations associated with the third path and to perform operations associated with the third path prior to performing operations associated with the first path.

11. The method as recited in claim 8, further comprising identifying at least one under-cut area within the region from the terrain data;
identifying at least one over-cut area within the region from the terrain data;
generating at least one grading task associated with the under-cut area and the over-cut area, the at least one grading task having at least one grading path;
collecting additional terrain data associated with the surface of the terrain of the region while the vehicle performs operations associated with the at least one grading task; and
sending the additional terrain data to the remote device.

12. A vehicle comprising:
at least one image device for capturing two-dimensional image data of a physical environment;
one or more processors; and
a computer-readable media storing instructions, which when executed by the one or more processors, cause the one or more processor to perform actions including:
receiving the two-dimensional image data from the at least one image device;
identifying a first object of interest and a second object of interest within the two-dimensional image data, the first object of interest remote from the vehicle;
determining a first location of the first object of interest within the physical environment based at least in part on a pixel level analysis of the two-dimensional image data;
determining a second location of the second object of interest within the physical environment based at least in part on the pixel level analysis of the two-dimensional image data;
determining a distance between the first object of interest and the second object of interest based at least in part on the first location and the second location;

determining a first characteristic and a shape of the first object of interest based at least in part on the image data;

generating one or more spreading tasks associated with the first object of interest based at least in part on the first location, the first characteristics, the shape, and the distance, the one or more spreading tasks including instruction to cause the vehicle to spread material associated with the first object of interest over at least a portion of the physical environment; and performing operations associated with the one or more spreading tasks.

13. The vehicle as recited in claim 12, wherein:

the computer-readable media stores additional instructions, which when executed by the one or more processors, cause the one or more processor to perform actions including receiving spreading parameters from a remote device; and the one or more spreading tasks associated with the first object of interest are based at least in part on the spreading parameters.

14. The vehicle as recited in claim 12, wherein the first characteristic includes a volume of the first object of interest.

15. The vehicle as recited in claim 12, wherein the first characteristic includes a contour profile of the first object of interest.

16. The vehicle as recited in claim 12, wherein the computer-readable media stores additional instructions, which when executed by the one or more processors, cause the one or more processor to perform actions including:

collecting terrain data associated with a surface of a terrain of the physical environment while performing the operations associated with the one or more spreading tasks; and sending the terrain data to a remote device.

17. The vehicle as recited in claim 16, wherein the computer-readable media stores additional instructions, which when executed by the one or more processors, cause the one or more processor to perform actions including:

identifying at least one under-cut area from the terrain data;

identifying at least one over-cut area from the terrain data;

generating at least one grading task associated with the under-cut area and the over-cut area;

collecting additional terrain data associated with the surface of the terrain of the physical environment while performing additional operations associated with the at least one grading task; and sending the additional terrain data to the remote device.

18. The vehicle as recited in claim 12, wherein the at least one image device includes two or more image devices configured to capture the two-dimensional image data of an overlapping portion of the physical environment.

19. The vehicle as recited in claim 12, wherein the at least one image device includes a light detection and ranging system.

20. The vehicle as recited in claim 12, wherein at least one of the one or more spreading tasks includes two or more paths.

* * * * *